United States Patent
Wilkin et al.

(10) Patent No.: US 8,700,027 B2
(45) Date of Patent: Apr. 15, 2014

(54) METHOD AND APPARATUS FOR NETWORK ANALYSIS

(75) Inventors: George P. Wilkin, Bolingbrook, IL (US); Dean W. Craig, Aurora, IL (US); Erik J. Major, Tinton Falls, NJ (US); Kenneth E. Depaul, Wake Forest, NC (US)

(73) Assignee: Alcatel Lucent, Paris (FR)

( * ) Notice: Subject to any disclaimer, the term of this patent is extended or adjusted under 35 U.S.C. 154(b) by 91 days.

(21) Appl. No.: 13/025,799

(22) Filed: Feb. 11, 2011

(65) Prior Publication Data

US 2012/0208562 A1    Aug. 16, 2012

(51) Int. Cl.
*H04W 24/00* (2009.01)

(52) U.S. Cl.
USPC ............. 455/423; 455/456.1; 455/456.2; 455/456.3; 455/424; 455/425

(58) Field of Classification Search
None
See application file for complete search history.

(56) References Cited

U.S. PATENT DOCUMENTS

| | | |
|---|---|---|
| 2006/0285489 A1 | 12/2006 | Francisco |
| 2009/0036116 A1 * | 2/2009 | Kim et al. .................... 455/423 |
| 2009/0257353 A1 * | 10/2009 | Song et al. .................... 370/241 |
| 2010/0091677 A1 * | 4/2010 | Griff et al. .................... 370/252 |
| 2012/0046040 A1 * | 2/2012 | Chatterjee ................. 455/456.1 |

FOREIGN PATENT DOCUMENTS

| | | |
|---|---|---|
| WO | WO 2007/005030 A2 | 1/2007 |
| WO | WO 2007/100402 A2 | 9/2007 |
| WO | WO 2009/054847 A1 | 4/2009 |

OTHER PUBLICATIONS

Mar. 30, 2012 International Search Report and the Written Opinion of the International Searching Authority, or the Declaration in PCT/US2012/024115, Alcatel-Lucent USA Inc., Applicant, 12 pages.

\* cited by examiner

*Primary Examiner* — Suhail Khan
(74) *Attorney, Agent, or Firm* — Wall & Tong, LLP

(57) ABSTRACT

A network analysis capability is provided herein. A network analysis capability supports proactive detection of service troubles in a network by looking at the network from the perspective of the end users. A proactive detection mechanism is provided by having end user devices (e.g., smartphones, computers, and the like) run background applications which monitor for service-impacting problems and autonomously report service-impacting problems when such problems are detected. A background application, before and/or after problems are detected, collects diagnostic information and forwards the diagnostic information to a network for analysis. A network node compiles and analyzes data collected from the end user devices, data collected from one or more network-based data collectors, and, optionally, information from one or more network support systems, to diagnose problems and dynamically respond, potentially before service is impacted.

20 Claims, 10 Drawing Sheets

400

500

700

METHOD AND APPARATUS FOR NETWORK ANALYSIS

FIELD OF THE INVENTION

The invention relates generally to communication networks and, more specifically but not exclusively, to supporting management of communication networks.

BACKGROUND

Wireless Network Service Providers (WNSPs) are facing a growing challenge to deliver new high-speed data services to end-users (e.g., end users using smart-phones and other types of wireless devices) with high service quality while minimizing operations costs. Within the context of this challenge, smartphones are putting a much greater demand on the wireless data network than traditional mobile phones. This increase in demand for real-time high speed data usage is frequently outpacing the ability of WNSPs to upgrade, monitor, and maintain the wireless data network. As a result, WNSPs utilize problem detection tools and operations methods in order to try to identify and resolve service-impacting troubles in the network in a manner that meets the challenge.

SUMMARY

Various deficiencies in the prior art are addressed by embodiments for providing a network analysis capability.

In one embodiment, an apparatus for controlling collection of data from a network includes a processor configured to: receive, from a wireless user device configured to communicate via a network path of the network, feedback information indicative of detection of an event by the wireless user device, wherein the feedback information comprises location information indicative of a geographic location of the wireless user device when the event is detected; identify, based at least in part on the location information, a network element of the network path that is configured for collecting data related to the event; and generate a message adapted for requesting collected data from the identified network element.

In one embodiment, a method for controlling collection of data from a network includes: receiving, at a network node from a wireless user device configured to communicate via a network path of the network, feedback information indicative of detection of an event by the wireless user device, wherein the feedback information comprises location information indicative of a geographic location of the wireless user device when the event is detected; identifying, based at least in part on the location information, a network element of the network path that is configured for collecting data related to the event; and generating a message adapted for requesting collected data from the identified network element.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF ILLUSTRATIVE EMBODIMENTS

Figure 1:
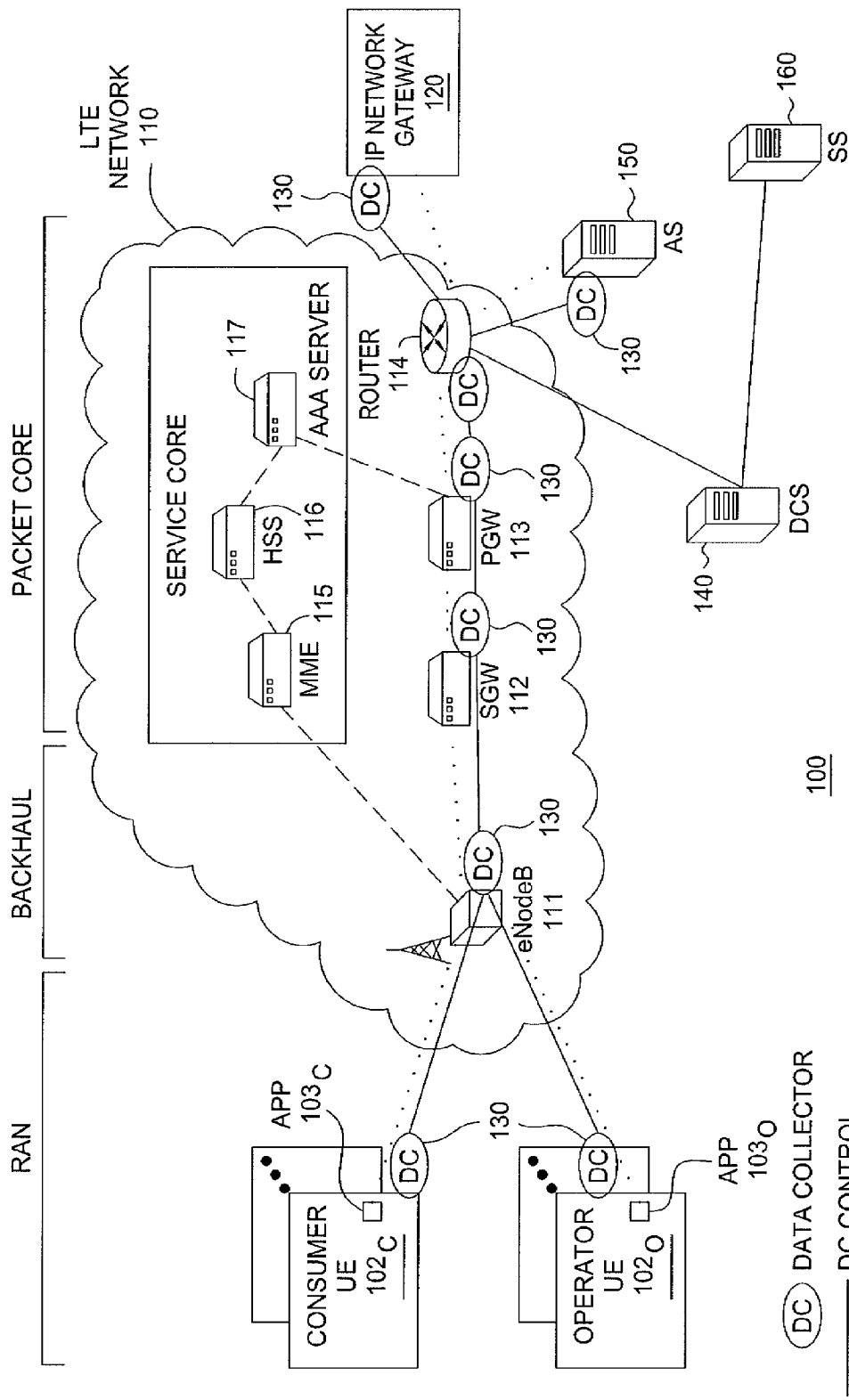
FIG. 1 depicts an exemplary wireless communication system, illustrating one embodiment of a network analysis capability within the context of an exemplary Long Term Evolution (LTE) network.

In general, a network analysis capability for use with a wireless network is depicted and described herein, although it is noted that various other capabilities also may be presented herein.

In at least some embodiments, the network analysis capability supports proactive detection of service troubles in a network by looking at the network from the perspective of the end users. In at least one embodiment, proactive detection is provided by having end user devices (e.g., smartphones and other devices) run background applications which monitor for service-impacting problems and autonomously report service-impacting problems when such problems are detected. The background applications, before and/or after problems are detected, collect diagnostic information and forward the diagnostic information to a network node for analysis. The network node compiles and analyzes data collected from the end user devices, data collected from one or more network-based data collectors, and, optionally, information from one or more network support systems, to diagnose problems and dynamically respond, potentially before service is even impacted. In this manner, wireless operators are able to provide their customers with improved quality of experience and reliability.

In at least some embodiments, the network analysis capability provides a coordinated activity management mechanism that is configured to anticipate data collection needs of network operation technicians while the network operation technicians are performing management functions for the wireless network (e.g., data needed in the course of troubleshooting a problem, data needed in the course of correcting a problem, and the like, as well as various combinations thereof). In this manner, at least some of the embodiments of network analysis capability provide a mechanism for addressing problem troubleshooting and resolution in response to problems in the wireless network.

In at least some embodiments, the network analysis capability provides improved data collection capabilities, enabling automated activation and deactivation of data collection, on various scales, based on various types of input information. For example, the network analysis capability may enable activation and/or deactivation of data collection based on one or more of information related to product-specific network performance, errors associated with specific end user devices or groups of end user devices on the wireless network, and the like, as well as various combinations thereof. In at least some cases, this provides improvements over capture of network diagnostic data based on recognition of a problem after the problem has occurred, and based on or even requiring manual setting of data collection by a network operator using a data capture tool.

In at least some embodiments, the network analysis capability supports targeted collection of data to be analyzed for use in performing various data analysis and associated management functions. The collection of data may be targeted at various levels of granularity (e.g., on an end user device basis, for one or more groups of end user devices sharing one or more common characteristics, on a wireless network node or associated interface basis, and the like, as well as various combinations thereof. As a result, in at least some cases, a need to capture and analyze data for all end user devices is obviated, thereby reducing the data storage capacity needed in order to provide various management functions, reducing the volume of data to be analyzed in order to provide various management functions, and the like, as well as various combinations thereof.

In at least some embodiments, the network analysis capability is configured to control data collection and analysis based on events detected by network elements and/or end user devices.

In at least some embodiments, the network analysis capability supports collection of data from network devices and/or end user devices.

In at least some embodiments, the network analysis capability supports coordinated capture of data streams, decoding of captured data streams (e.g., which may include decoding of bearer traffic), analysis of decoded data streams, and the like, as well as various combinations thereof.

In at least some embodiments, the network analysis capability enables collection of information about the characteristics of transport across various domains of a wireless data network (e.g., RAN, backhaul, packet core, and the like), thereby improving coordination of data collection by tools in the network and improving the data collection management capabilities that are available to network operators (e.g., for planning, running, and managing data capture and analysis functions).

In at least some embodiments, the network analysis capability facilitates targeted data collection and/or analysis for use in performing various management functions. For example, the management functions may include network monitoring and/or management functions, service monitoring and/or management functions, and the like, as well as various combinations thereof (at least some of which may include problem prediction analysis functions, root cause analysis functions, recommendation functions, and the like, as well as various combinations thereof).

In at least some embodiments, the network analysis capability is configured to perform analysis for use in performing various management functions (e.g., performing root cause analysis, recommending remedies, and the like) based on traffic issues.

In at least some embodiments, the network analysis capability is configured to combine various forms of network-data-related information (e.g., data captured from or associated with the network, results of analysis of data captured from or associated with the network, and the like) with non-network-data-related information and/or tools (e.g., configuration logic and/or data, service logic and/or data, and the like, as well as various combinations thereof).

Although primarily depicted and described herein within the context of a specific type of wireless communication network (namely, a Long Term Evolution (LTE) network), it is noted that at least some of the embodiments of the network analysis capability may be applicable for use with other types of wireless communication networks and/or wired communication networks.

Various embodiments of the network analysis capability may be better understood by way of reference to application of embodiments of the network analysis capability to an exemplary wireless network, as depicted in FIG. 1.

FIG. 1 depicts an exemplary wireless communication system illustrating one embodiment of a network analysis capability within the context of an exemplary Long Term Evolution (LTE) network.

As depicted in FIG. 1, exemplary wireless communication system 100 includes a plurality of User Equipments (UEs) or User Devices (UDs) 102, a Long Term Evolution (LTE) network 110, an IP Network Gateway (ING) 120, a plurality of Data Collectors (DCs) 130, a Data Collection Server (DCS) 140, an Application Server (AS) 150, and a System Server (SS) 160.

The UEs 102 include a plurality of consumer UEs $102_C$ and, optionally, one or more operator UEs $102_O$. In general, the consumer UEs $102_C$ include end user devices used by customers of a wireless network service provider which provides wireless service via exemplary wireless communication system 100. In general, the operator UEs $102_O$ include end user devices which may be used by network operator technicians (also referred to more generally as operators) to perform various functions for the wireless network service provider (e.g., network performance testing and analysis functions, network performance degradation and error diagnostic functions, and the like, as well as various combinations thereof).

The consumer UEs $102_C$ include wireless user devices capable of accessing a wireless network, such as LTE network 110. In general, a consumer UE $102_C$ is capable of supporting: (1) one or more bearer sessions to one or more IP networks (omitted for purposes of clarity) via LTE network 110 and (2) control signaling in support of the bearer session(s). For example, the consumer UEs $102_C$ may include smartphones, computers, and/or any other type(s) of wireless user device(s).

In one embodiment, a consumer UE $102_C$ is configured to support various functions of the network analysis capability.

In one embodiment, for example, a consumer UE $102_C$ may be configured to monitor for one or more events which, when detected, trigger the consumer UE $102_C$ to perform one or more function which facilitate collection of data associated with LTE network 110.

In one embodiment, for example, detection of a trigger condition may trigger the consumer UE $102_C$ to propagate, toward one or more of DCs 130, DCS 140, and SS 160, data collection feedback information adapted for causing one or more of DCs 130, DCS 140, and SS 160 to initiate data collection processes (e.g., for causing DCs 130 to collect data, for causing DCS 140 to generate control data for causing DCs 130 to collect data, and the like, as well as various combinations thereof). The data collection feedback information may include any information for use in instructing one or more of DCs 130, DCS 140, and SS 160 to initiate data collection processes (and, optionally, for controlling one or more aspects of the data collection processes (e.g., granularity, timing, indications of the type(s) of data to be collected, and the like, as well as various combinations thereof). The data collection feedback information may include information which may be used by DCS 140 and/or SS 160 for obtaining additional information (e.g., from elements of LTE network 110) which may be processed by DCS 140 and/or SS 160 for providing management functions. For example, the data collection feedback information may include an identifier of the consumer UE $102_C$, information associated with the consumer UE $102_C$ (e.g., manufacturer, model, device capabilities, and the like), location information associated with the UE $102_C$ (e.g., location information from Location Based Services (LBS), Global Positioning System (GPS) data, Assisted-GPS (A-GPS data), and the like), and the like, as well as various combinations thereof.

In one embodiment, for example, detection of a trigger condition may trigger the consumer UE $102_C$ to propagate collected data, collected by the consumer UE $102_C$, toward one or more of DCS 140, AS 150, and SS 160. The trigger condition may be one or more of detection of an event by the consumer UE $102_C$ which might cause the consumer UE $102_C$ to provide data collection feedback information to DCS 140, receipt of data collection control instructions from DCS 140, local detection of a condition by the consumer UE $102_C$, and the like. In one embodiment, for example, the collected data may include information which may be processed by one or more of DCS 140, AS 150, and SS 160 (e.g., for causing DCS 140 to initiate data feedback control information for causing one or more DCs 130 to collect data, for causing AS 150 to initiate one or more tests, for enabling DCS 140 and/or SS 160 to provide one or more management functions, and the like, as well as various combinations thereof). For example, the collected data may include event detection information (e.g., type of event detected, details of the detected event, location information indicative of the geographic location of the consumer UE $102_C$ when the event is detected, and the like), bearer and/or control data of the consumer UE $102_C$, traps for reporting errors that were recognized by the consumer UE $102_C$, results of data transmission tests performed by the consumer UE $102_C$, location information indicative of the network and/or geographic location of the consumer UE $102_C$ with respect to any of the foregoing types of collected data, and the like, as well as various combinations thereof.

In one embodiment, one or more of the consumer UEs $102_C$ may be configured to include a DC 130 configured to collect such data and provide such data to DCS 140 and/or SS 160.

In one embodiment, each of the consumer UEs $102_C$ includes an application $103_C$, respectively. The application $103_C$ of a consumer UE $102_C$ may be configured to provide various capabilities as depicted and described herein (e.g., trigger detection, propagation of data collection feedback information to DCS 140, collection of data, and the like). In one embodiment, the application $103_C$ is configured to initiate a data collection feedback message to DCS 140 in response to detection of a trigger condition by the application $103_C$ (e.g., data communication error associated with the consumer UE $102_C$, quality of service degradation associated with the consumer UE $102_C$, and the like). In one embodiment, the application $103_C$ is configured to propagate one or more other types of information (e.g., trigger event notices, trigger requests intended for servers, and the like). In one embodiment, the application $103_C$ is configured to determine location information (e.g., for propagation to DCS 140 as part of the data collection feedback information, for association with collected data that is collected by DC 130 of the consumer UE $102_C$, and the like). In one embodiment, the application $103_C$ is configured to control the DC 130 that is local to the consumer UE $102_C$ (e.g., for controlling collection of information which may be provided to DCS 140 as data collection feedback information, collected data, and the like, as well as various combinations thereof). In one embodiment, the application $103_C$ is configured to gather network data. In one embodiment, the application $103_C$ is configured to perform tests (e.g., sending test packets to AS 150 and/or receiving test packets from AS 150, sending test packets to one or more network elements of LTE network 110 and/or receiving test packets from one or more network elements of LTE network 110, and the like, as well as various combinations thereof) in response to one or more conditions (e.g., detection of a trigger by consumer UE $102_C$, receipt of a data collection control information from DCS 140, and the like). In one embodiment, the application $103_C$ is configured to operate in a stealth mode on the consumer UE $102_C$ (e.g., where triggers are preset (e.g., by the WNSP) and are not user controllable). In one embodiment, the application $103_C$ is configured to operate in a full-control mode on the consumer UE $102_C$ (e.g., where the end user has control one or more of the application $103_C$, the command stream to the server interfaces (e.g., DCS 140 and, optionally, SS 160), and the like) and, similarly, to support a user interface for enabling control by the user of consumer UE $102_C$. In one embodiment, the application $103_C$ is configured to support operator control of the application $103_C$ on consumer UE $102_C$. In one embodiment, the application $103_C$ is configured to control communications by the consumer UE $102_C$ with LTE network 110 (e.g., temporarily pausing cellular communication by consumer UE $102_C$ and the like). It is noted that the application $103_C$ may be configured to support various combinations of such functions. It is noted that the application $103_C$ may be configured to support various other functions depicted and described herein as being supported by consumer UEs $102_C$. It is noted that functions depicted and described herein as being provided by the application $103_C$ may be provided by the consumer UE $102_C$ in dependent of or in conjunction with the application $103_C$ of the consumer UE $102_C$. These and other functions of the application $103_C$ may be better understood by way of reference at least to FIGS. 2, 3, 4, 5, and 7. Although primarily depicted and described with respect to an embodiment in which all consumer UEs $102_C$ include applications $103_C$, it is noted that in at least some embodiments only a subset of the consumer UEs $102_C$ include applications $103_C$.

In general, a consumer UE $102_C$ may be configured for such purposes in any suitable manner (e.g., via functionality built into the consumer UE $102_C$, via one or more applications installed on the consumer UE $102_C$ (e.g., pre-installed, downloaded from AS 150 or any other suitable source, and the like), and the like, as well as various combinations thereof).

It is noted that a consumer UE $102_C$ may be configured to support various other functions of the network analysis capability.

The operator UEs $102_O$ include wireless devices configured for use by network technicians of the wireless network service provider.

In one embodiment, at least some of the operator UEs $102_O$ may be similar to consumer UEs $102_C$ (although may be configured differently to support functions to be performed by network operation technicians which would not be provided by consumers).

In one embodiment, at least some of the operator UEs $102_O$ may be specialized devices for use by network operation technicians which would not be provided by consumers).

For example, operator UEs $102_O$ may be configured to monitor for one or more events which, when detected, trigger the operator UE $102_O$ to perform one or more function which facilitate collection of data associated with LTE network 110.

In one embodiment, for example, detection of a trigger condition may trigger the operator UE $102_O$ to propagate, toward one or more of DCs 130, DCS 140, and SS 160, data collection feedback information adapted for causing one or more of DCs 130, DCS 140, and SS 160 to initiate data collection processes (e.g., for causing DCs 130 to collect data, for causing DCS 140 to generate control data for causing DCs 130 to collect data, and the like, as well as various combinations thereof).

In one embodiment, each of the operator UEs $102_O$ includes an application $103_O$, respectively. In one embodiment, the applications $103_O$ of UEs $102_O$ include at least some of the capabilities of applications $103_C$ of consumer UEs $102_C$. The applications $103_O$ of UEs $102_O$ may include various other functions which may be used by network operators (e.g., additional test initiation and analysis capabilities, additional data collection and analysis control capabilities, and the like, as well as various combinations thereof). These and other functions of the application $103_O$ may be better understood by way of reference at least to FIGS. 2 and 6. Although primarily depicted and described with respect to an embodiment in which all operator UEs $102_O$ include applications $103_O$, it is noted that, in at least some embodiments, only a subset of the operator UEs $102_O$ include applications $103_O$.

In one embodiment, for example, detection of a trigger condition may trigger the operator UE $102_O$ to propagate collected data, collected by the operator UE $102_O$, toward one or more of DCS 140, AS 150, and SS 160.

In one embodiment, one or more of the operator UEs $102_O$ may be configured to include a DC 130 configured to collect such data and provide such data to DCS 140 and/or SS 160.

In one embodiment, one or more of the operator UEs $102_O$ may be configured to include an application as depicted and described herein with respect to consumer UEs $102_C$.

In general, a operator UE $102_O$ may be configured for such purposes in any suitable manner (e.g., via functionality built into the operator UE $102_O$, via one or more applications installed on the operator UE $102_O$ (e.g., pre-installed, downloaded from AS 150 or any other suitable source, and the like), and the like, as well as various combinations thereof).

It is noted that an operator UE $102_O$ may be configured to support various other functions of the network analysis capability.

The LTE network 110 supports communications between the UEs 102 and ING 120 (which provides access to one or more associated IP networks). Although omitted for purposes of clarity, it is noted that various non-LTE access networks may interface with LTE network 110 for enabling UEs/UDs associated with non-LTE access networks to utilize the LTE network 110 to access IP networks via ING 120.

The LTE network 110 is an exemplary LTE network. The configuration and operation of LTE networks will be understood by one skilled in the art. However, for purposes of completeness, a description of general features of LTE networks is provided herein within the context of exemplary wireless communication system 100.

The LTE network 110 includes an eNodeB 111, a Serving Gateway (SGW) 112, a Packet Data Network (PDN) Gateway (PGW) 113, a router 114, a Mobility Management Entity (MMEs) 115, a Home Subscriber Server (HSS) 116, and an Authentication, Authorization, Accounting (AAA) Server 117. The eNodeB 11 provides a radio access interface for UEs 102. The SGW 112, PGW 113, router 114, MME 115, HSS 116, and AAA Server 117 (and, optionally, other components which have been omitted for purposes of clarity), cooperate to provide an Evolved Packet Core (EPC) supporting end-to-end service delivery using IP. The MME 115, HSS 116, and AAA Server 117 may cooperate to provide a Service Core within the EPC of LTE network 110.

The eNodeB 111 supports communications for UEs 102. For example, the communication between UEs 102 and eNodeB 111 may be supported using LTE-Uu interfaces associated with each of the UEs 102. The eNodeB 111 may support any functions suitable for being supported by an eNodeB, such as providing an LTE air interface for the UEs 102, performing radio resource management, facilitating communications between UEs 102 and SGW 112, maintaining mappings between the LTE-Uu interfaces and S1-u interfaces supported between the eNodeB 111 and SGW 112, and the like, as well as combinations thereof. As depicted in FIG. 1, eNodeB 111 may be configured to include a DC 130 configured to collect data in support of various functions of the network analysis capability. Although a single eNodeB is depicted, it is noted that an LTE network is likely to include many eNodeBs.

The SGW 112 support communications for eNodeB 111. For example, the communication between SGW 112 and eNodeB 111 may be supported using an S1-u interface, which may support per-bearer user plane tunneling and inter-eNodeB path switching during handover and which may use any suitable protocol, e.g., the GPRS Tunneling Protocol-User Place (GTP-U). The SGW 112 may support any functions suitable for being supported by an SGW, such as routing and forwarding user data packets (e.g., facilitating communications between eNodeB 111 and PGW 113, maintaining mappings between the S1-u interfaces and S5/S8 interfaces supported between SGW 112 and PGW 113, and the like), functioning as a mobility anchor for UEs during inter-eNodeB handovers, functioning as a mobility anchor between LTE and other 3GPP technologies, and the like, as well as combinations thereof. As depicted in FIG. 1, SGW 112 may be configured to include a DC 130 configured to collect data in support of various functions of the network analysis capability. Although a single SGW is depicted as supporting a single eNodeB, it is noted that an SGW is likely to support multiple eNodeBs and, further, that an LTE network is likely to include more than one SGW.

The PGW 113 supports communications for SGW 112. For example, the communication between PGW 113 and SGW 112 may be supported using an S5/S8 interface. In general, an S5 interface provides functions such as user plane tunneling and tunnel management for communications between PGW 113 and SGWs 112, SGW relocation due to UE mobility, and the like. In general, an S8 interface, which may be a Public Land Mobile Network (PLMN) variant of an S5 interface, provides inter-PLMN interfaces providing user and control plane connectivity between the SGW in the Visitor PLMN (VPLMN) and the PGW in the Home PLMN (HPLMN). The S5/S8 interfaces may utilize any suitable protocol (e.g., the GPRS Tunneling Protocol (GTP), Mobile Proxy IP (MPIP), and the like, as well as combinations thereof). The PGW 113 facilitates communications between LTE network 110 and the ING 120 via an SGi interface. The PGW 113 may support any functions suitable for being supported by an PGW, such as providing packet filtering, providing policy enforcement, functioning as a mobility anchor between 3GPP and non-3GPP technologies, and the like, as well as combinations thereof. As depicted in FIG. 1, PGW 113 may be configured to include a DC 130 configured to collect data in support of various functions of the network analysis capability. Although a single PGW is depicted as supporting a single SGW, it is noted that a PGW is likely to support multiple SGWs and, further, that an LTE network may include more than one PGW.

The router 114 may be configured to facilitate routing of traffic between elements of LTE network 110 (e.g., between PGW 111 and AAS Server 117), between LTE network 110 (e.g., PGW 113) and ING 120, between LTE network 110 (e.g., PGW 113) and DCS 140, between LTE network 110 (e.g., PGW 113) and AS 150, and the like, as well as various combinations thereof. Although omitted for purposes of clarity, it will be appreciated that various other routers may be deployed (e.g., at the backhaul leading into the SGW 112, at the SGW 112, at the PGW 113, and/or in any other suitable locations for facilitating routing of traffic within LTE network 110).

The MME 114 provides mobility management functions in support of mobility of UEs 102. The MME 114 supports eNodeB 111 (as well as other eNodeBs which are omitted for purposes of clarity). The communication between MME 114 and eNodeB 111 may be supported using a S1-MME interface, which provides control plane protocols for communication between the MME 114 and the eNodeB 111. The S1-MME interface may use any suitable protocol or combination of protocol. For example, the S1-MME interface may use the Radio Access Network Application Part (eRANAP) protocol while using the Stream Control Transmission Protocol (SCTP) for transport. The MME 114 supports the SGW 112. The communication between MME 114 and SGW 112 may be supported using a 811 interfaces. The MME 114 may support any functions suitable for being supported by a MME, such selecting SGWs for UEs at time of initial attachment by the UEs and at time of intra-LTE handovers, providing idle-mode UE tracking and paging procedures, bearer activation/deactivation processes, providing support for Non-Access Stratum (NAS) signaling (e.g., terminating NAS signaling, ciphering/integrity protection for NAS signaling, and the like), lawful interception of signaling, and the like, as well as combinations thereof. The MME 114 also may communicate with HSS 116 using an S6a interface for authenticating users.

The HSS 116 is configured to provide functions typically supported by an HSS in an LTE network. For example, HSS 116 may maintain subscriber-related information (e.g., subscriber profiles associated with users of UEs 102), perform user authentication and/or authorization functions, tracking and provide subscriber-related information (e.g., subscriber location, IP address information, and the like), and the like. The typical use of such functions within LTE network 110 will be understood by one skilled in the art.

The AAA Server 117 is configured to provide functions typically supported by an AAA Server, such as authentication, authorization, accounting, and like functions. For example, authentication may include authentication of the identity of entities (e.g., using credentials). For example, authorization may include determining whether a particular entity is authorized to perform a given activity (e.g., based on various restrictions and associated rules). For example, accounting may include event tracking, tracking of consumption of network resources, and the like. The typical use of such functions within LTE network 110 will be understood by one skilled in the art.

The ING 120 is configured to operate as a gateway from LTE network 110 to one or more IP networks (which are omitted for purposes of clarity). The IP networks accessible via LTE network 110 and ING 120 may include one or more packet data networks via which UEs 102 may access content, services, and the like. For example, the IP network(s) accessible via LTE network 110 and ING 120 may include a public IP network (e.g., the Internet), an IP Core network of the WNSP, one or more other IP networks (e.g., IP Multimedia Subsystem (IMS) networks and the like), and the like, as well as various combinations thereof. The access to IP networks may be provided for UEs 102 which access LTE network 110 via eNodeB 111 and optionally, for UEs associated with one or more non-LTE networks with which LTE network 110 may interface (e.g., 3GPP access networks, non-3GPP access networks, and the like). As depicted in FIG. 1, ING 120 may be configured to include a DC 130 configured to collect data in support of various functions of the network analysis capability.

As depicted in FIG. 1, a number of different types of traffic may be propagated within exemplary wireless communication system 100. For example, bearer and test traffic, network control traffic, DC control traffic, and the like, as well as various combinations thereof, may be exchanged between various combinations of elements of exemplary wireless communication system 100.

As depicted in FIG. 1, bearer traffic may be sent along a path between a UE 102 and ING 120, where the path includes eNodeB 111, SGW 112, PGW 113, and router 114. Similarly, as depicted in FIG. 1, test traffic may be sent along a path between a UE 102 and AS 150, where the path includes eNodeB 111, SGW 112, PGW 113, and router 114. The bearer and test traffic flows are marked in FIG. 1.

It is noted that the path along which bearer traffic flows for a given UE 102 may be referred to herein as a network data path or, more generally, as a network path.

For example, each UE 102 is configured to communicate along a network data path including eNodeB 111, SGW 112, PGW 113, router 114, and ING 120, each of which has a DC 130 configured thereon or associated therewith. The inclusion of DCs 130 on each of the elements along the network data path via which a UE 102 is communicating or may communicate enables collection of data from elements along the network data path. Although primarily depicted and described with respect to a single network data path, it is noted that different UEs 102 may communicate along different network data paths (e.g., where UEs 102 access LTE network 110 via different eNodeBs or other access devices, where different SGWs support different sets of eNodeBs via which UEs 102 access LTE network 110, where load balancing and/or other traffic control capabilities are employed, and the like, as well as various combinations thereof).

As depicted in FIG. 1, network control traffic may be exchanged within the service core, and between the service core and other elements not forming part of the service core. For example, network control traffic may be exchanged between eNodeB 111 and MME 115, between MME 115 and HSS 116, between HSS and AAA Server 117, and between AAA Server and PGW 113. It is noted that the network control traffic paths depicted in FIG. 1 are merely exemplary, and that various other combinations of network control paths may be supported. The network control traffic flows are marked in FIG. 1.

As depicted in FIG. 1, DC control traffic may be exchanged between various elements of exemplary wireless communication system 100 which may be involved in data collection according to various embodiments depicted and described herein.

In one embodiment, DCS 140 may exchange DC control traffic with any of the DCs 130 of any of the elements of exemplary wireless communication system 100 (e.g., consumer UEs 102$_C$, operator UEs 102$_O$, eNodeB 111, SGW 112, PGW 113, router 114, ING 120, AS 150, and the like).

In one embodiment, as depicted in FIG. 1, DC control traffic is exchanged between DCS 140 and each of the DCs 130 (with the exception of the DC 130 associated with AS 150) in a linear manner via router 114 and the network data path. For example, DC control traffic sent by a consumer UE 102$_C$ and intended for DCS 140 will traverse the path from UE 102$_C$ to eNodeB 111 to SGW 112 to PGW 113 to router 114 to DCS 140. Similarly, for example, DC control traffic sent by SGW 112 and intended for DCS 140 will traverse the path from SGW 112 to PGW 113 to router 114 to DCS 140.

It is noted that, although DC control traffic is depicted as being routed between DCS 140 and each of the DCs 130 (with the exception of the DC 130 associated with AS 150) in a linear manner via router 114 and the network data path, DC control traffic may be exchanged between DCS 140 and one or more of the DCs 130 in any other suitable manner. For example, DCS 140 and any of the DCs 130 may exchange DC control traffic via any other suitable communication paths which may be supported between DCS 140 and any of the DCs 130.

In one embodiment, as depicted in FIG. 1, DC control traffic is exchanged between DCS 140 and AS 150 via router 114. It is noted that, although DC control traffic is depicted as being routed between DCS 140 and AS 150 via router 114, DC control traffic may be exchanged between DCS 140 and AS 150 in any other suitable manner. For example, DCS 140 and AS 150 may exchange DC control traffic via any other suitable communication paths which may be supported between DCS 140 and AS 150.

In one embodiment, DCS 140 may exchange DC control traffic with SS 160. In one embodiment, as depicted in FIG. 1, DC control traffic is exchanged between DCS 140 and SS 160 via a communication path that does not traverse the LTE network 110.

The DC control traffic may include any types of traffic associated with supporting collection of data. For example, the DC control traffic may include data collection feedback information provided from UEs 102 to DCS 140, data collection control information generated by DCS 140 and propagated to one or more DCs 130 for controlling collection of data by one or more DCs 130, data collected by DCs 130 and provided to DCS 140 and/or SS 160, and the like, as well as various combinations thereof. The DCs 130 are configured to collect data to be provided to DCS 140 (and, optionally, one or more other systems).

The DCs 130 may be configured to collect data in response to data collection control information received at the DCs 130 from DCS 140.

The DCs 130 may be configured to collect data independent of data collection control information received at the DCs 130 from DCS 140. In this case, the DCs 130 may collect data independent of control by DCS 140, and receipt of data collection control information from DCS 140 triggers the DCs 130 to provide the previously collected data to DCS 140.

The DCs 130 are configured to store collected data locally. The DCs 130 may store collected data locally using any suitable data storage mechanisms. In one embodiment, DCs 130 may storage data by buffering the data (e.g., using circular buffers and/or any other suitable types of buffers).

The DCs 130 are configured to provide collected data to one or more other network elements for processing (e.g., DCS 140, SS 160, and the like, as well as various combinations thereof).

The DCs 130 may collect any suitable types of data, which may depend on the type(s) of network elements on which the DCs 130 are implemented. For example, at least some of the data collected on a UE 102, eNodeB 111, SGW 112, PGW 113, ING 130, and AS 150 may be different across these different devices. In one embodiment, a DC 130 may be configured to operate as a network IP packet monitor for collecting data along the network path (e.g., collecting bearer traffic along the network path between a UE 102 and ING 120).

In one embodiment, DCs 130 are configured to timestamp collected data. The timestamp information may be used locally by the DCs 130 for responding to data requests from DCS 140, provided to DCS 140 along with the collected data that is time stamped, and the like, as well as various combinations thereof.

Although primarily depicted and described herein with respect to embodiments in which DCs 130 passively collect data, it is noted that one or more DCs 130 may be configured to perform various functions for triggering collection of data. In one embodiment, for example, one or more DCs 130 may be configured for initiating tests within exemplary wireless communication system 100. For example, DCs 130 associated with UEs 102 may initiate test packets and collect the associated test results. For example, the DC 130 associated with AS 150 may initiate test packets and collect the associated test results. It is noted that DCs 130 may be configured for initiating various other types of activities which may facilitate local and/or remote collection of data by those DCs 130.

Although primarily depicted and described herein with respect to embodiments in which DCs 130 are controlled by DCS 140, it is noted that one or more of the DCs 130 also may be controlled by one or more other elements of exemplary wireless communication system 100. In one embodiment, DCs 130 available on the consumer UEs 102$_C$ are controllable by the consumer UEs 102$_C$, respectively. In one embodiment, DCs 130 available on the operator UEs 102$_O$ are controllable by the operator UEs 102$_O$, respectively. In one embodiment, DCs 130 available one or more elements of LTE network 110 are controllable by consumer UEs 102$_C$ and/or operator UEs 102$_O$.

As described herein, a DC 130 may be provided on a given element of exemplary wireless communication system 100 in any suitable manner. For example, a DC 130 may be provided on a given element of exemplary wireless communication system 100 at any suitable time. For example, a DC 130 may be provided on a given element of exemplary wireless communication system 100 prior to deployment of the element, after deployment of the element (e.g., via configuration of the element to dedicate memory for collection of data or in any other suitable manner), and the like, as well as various combinations thereof).

Although primarily depicted and described herein with respect to embodiments in which a DC 130 is configured on specific elements of exemplary wireless communication system 100, it is noted that DCs 130 may be configured on any element or elements of exemplary wireless communication system 100).

Similarly, although primarily depicted and described herein with respect to embodiments in which each element of exemplary wireless communication system 100 having a DC 130 configured thereon has only a single DC 130 configured thereon, it is noted that multiple DCs 130 may be configured on one or more of the elements of exemplary wireless communication system 100. In at least some such embodiments, multiple DCs 130 of an element of exemplary wireless communication system 100 may be dedicated for different purposes (e.g., for different types of data to be collected, for different servers supported by exemplary wireless communication system 100, and the like, as well as various combinations thereof).

Similarly, although primarily depicted and described herein with respect to embodiments in which DCs 130 are implemented on existing elements of the exemplary wireless communication system 100, it is noted that, in at least some embodiments, at least a portion of the DCs 130 may be provided as standalone elements (e.g., in communication with existing elements of the exemplary wireless communication system 100, disposed in communication paths between existing elements of the exemplary wireless communication system 100, and the like, as well as various combinations thereof).

The DCS 140 is configured to provide various data collection control capabilities. The DCS 140 is configured to receive data collection feedback information adapted for use by the DCS 140 in configuring the collection of data by the DCs 130. The DCS 140 is configured to generate, on the basis of the data collection feedback information, data collection control information adapted for use by the DCs 130 in determining collection of data. The DCS 140 is configured to propagate the data collection control information to the appropriate DCs 130 for instructing the DCs 130 to collect data.

The data collection feedback information may include any information suitable for use by DCS 140 in determining the manner in which data is to be collected by DCs 130. The data collection feedback information may be received from any suitable source(s) of such information (e.g., consumer UEs $102_C$, operator UEs $102_O$, elements of LTE network 110, AS 150, SS 160, other network elements and/or management systems not depicted, and the like, as well as various combinations thereof. The type of data collection feedback information received by DCS 140 may vary depending upon the source of the data collection feedback information.

In one embodiment, for example, the data collection feedback information may include device information (e.g., the type of device, information indicative of the manner in which the device is configured, information indicative of the functions supported by the device, and the like, as well as various combinations thereof). For example, the data collection feedback information may indicate whether the feedback is from a UE 102, eNodeB 111, SGW 112, and the like. For example, the data collection feedback information received from a UE 102 may indicate the type of device of the UE 102, device manufacturer and model information about the UE 102, capabilities of the UE 102, and the like.

In one embodiment, the data collection feedback information includes error trap messages received from elements of the exemplary wireless communication system 100. The DCS 140 may be configured to monitor for error trap messages In one embodiment, the data collection feedback information includes trigger information received from UEs 102. In one embodiment, the trigger information received from a UE 102 includes an identifier of the UE 102, location information associated with the UE 102, and the like, as well as various combinations thereof.

In one embodiment, the data collection feedback information includes data collected by one or more of the DCs 130. For example, data collected by one or more of the DCs 130 may be indicative that other data should be collected from one or more of the DCs 130 (e.g., one or more of the same DCs 130, one or more different DCs 130, and the like). In this case, DCS 140 may generate data collection control information and propagate the data collection control information to one or more DCs 130 for instructing the DCs 130 to collect data.

The data collection feedback information may include any other suitable types of information which may be used by DCS 140 for instructing DCs 130 to collect data.

It is noted that various combinations of such data collection feedback information may be received by DCS 140 and used by DCS 140 for controlling data collection by DCs 130.

The DCS 140 may receive collected data at any suitable time. For example, the DCS 140 may query DCs 130 for collected data at any suitable time (e.g., periodically, in response to one or more trigger conditions, in response to a determination that certain collected data is needed or desired, and the like, as well as various combinations thereof).

The data collection control information may include any information adapted for use in controlling collection of data by the DCs 130.

In one embodiment, for example, the data collection control information may identify the type of data to be collected. For example, the data collection control information may specify one or more of collection of bearer traffic of a specific UE 102, collection of bearer traffic of a group of UEs 102 (e.g., UEs 102 using a specific service, UEs of a given device type and version number, and the like), collection of control traffic associated with a UE 102 or group of UEs 102, collection of control traffic associated with a particular interface or group of interfaces, test traffic associated with a particular UE 102 or group of UEs 102, and the like, as well as various combinations thereof.

In one embodiment, for example, the data collection control information may indicate time-related parameters associated with collection of data (e.g., a time at which data collection should begin and/or end, the length of time for which data should be collected, and the like).

In one embodiment, for example, the data collection control information may indicate the quantity of data to be collected.

The data collection control information may include various combinations of such information for providing control over various aspects of data collection (e.g., granularity, type, quantity, and the like, as well as various combinations thereof).

The data control information may specify that previously collected data should be provided to DCS 140 (e.g., specific data collected at a specific moment in time, all data collected for a particular UE 102 or group of UEs 120 in the last 24 hours, and the like).

In one embodiment, for example, the data collection control information may be configured to trigger initiation of test streams by one or more elements of exemplary wireless communication system 100 (e.g., UEs 102, AS 150, and/or any other suitable elements). This also may include information indicative of the type of results to be provided from the elements to DCS 140. This type of data collection control information may be provided via the associated DCs 130 of the elements and/or in any other suitable manner.

The DCS 140 may be configured to prioritize data collection feedback information and/or data collection control information. For example, DCS 140 may be configured to prioritize data collection feedback information in order to control the order in which associated data collection control information is generated and provided to DCs 130 based on the data collection feedback information. For example, DCS 140 may be configured to prioritize data collection control information for purposes of optimizing data collection by the DCs 130 (e.g., based importance of conditions and/or triggers which cause collection of data, based on the time at which the data is to be collected, and the like).

The DCS 140 may be configured to process collected data for providing various functions. For example, the DCS 140 may be configured to apply intelligence to collected data in order to identify events, determine the locations of events (e.g., network locations, geographic locations, and the like), determine if additional data needs to be collected in order for further analysis to be performed (e.g., for further analysis by one or more of DCS 140, SS 160, and/or any other suitable element), determine network performance, identify devices causing network performance degradation, and the like, as well as various combinations thereof). For example, the DCS 140 may be configured to process collected data for purposes of providing pre-processing of the collected data before it is provided to SS 160 (e.g., organizing the collected data, prioritizing collected data, formatting collected data, and the like, as well as various combinations thereof).

The DCS 140 may be configured to provide information to SS 160. The information may include one or more of raw data collected by DCs 130 and received at DCS 140, processed data including collected data processed by DCS 140 before providing it to SS 160, analysis information determined by DCS 140 based on processing of collected data received at DCS 140 from DCs 130, and the like, as well as various combinations thereof. As described herein, SS 160 may process any such information received from DCS 140 for providing various management functions (e.g., problem identification analysis, root cause analysis, problem resolution analysis, network performance monitoring, and the like, as well as various combinations thereof).

In one embodiment, DCS 140 is configured with business intelligence for purposes of providing one or more of the functions depicted and described herein as being performed by DCS 140.

In one embodiment, DCS 140 is configured to anticipate data collection requirements based on a combination of user control and associated logic. The DCS 140 may be configured to anticipate data collection requirements using predefined rules and/or business logic, based on analysis of historical data collected under the control of DCS 140, and the like.

In one embodiment, DCS 140 is configured to distinguish between single events (e.g., which may, alone, be unimportant anomalies) and multiple events which may bear additional monitoring. In one embodiment, DCS 140 is configured to distinguish between unimportant and important events reported by UEs 102. In at least some such embodiments, DCS 140 is configured to support user-defined parameters for various trap thresholds and logic for prioritizing incoming events (e.g., the associated traps that are triggered).

In one embodiment, DCS 140 is configured to detect a network element that is experiencing performance degradation or failing, and the reason for performance degradation or failure. The one such embodiment, for example, DCS 140 is configured to determine whether a network element is experiencing performance degradation or failure due to access load or traffic overload. If, for example, a network had a lot of capacity, but was overloaded at a node due to massive access requests, DCS 140 would detect and report on the specific access devices or applications which affected that node. In this case, DCS 140 can recommend limiting access of the device or devices and/or pausing the device or devices (and/or of specific applications and/or services being utilized by the device or devices), in order to keep access robust. The DCS 140 also may be configured to provide similar functions for a device or devices (and/or of specific applications and/or services being utilized by the device or devices) which generate a lot of traffic. Similarly, in this case, DCS 140 can recommend limiting access of the device or devices and/or pausing the device or devices (and/or of specific applications and/or services being utilized by the device or devices), in order to limit heavy data users and provide thereby better access to the node for better location throughput.

The DCS 140 may be configured to provide various other functions as depicted and described herein.

The SS 160 is configured to support control and/or management functions for various portions of exemplary wireless communication system 100 (e.g., for LTE network 110, DCS 140, AS 150, and the like, as well as various combinations thereof).

The SS 160 is configured to receive information from DCS 140 for use in providing various management and related functions. For example, the information may include collected data, pre-processed versions of collected data, results of analysis performed by DCS 140, and the like, as well as various combinations thereof.

In one embodiment, SS 160 is configured to provide long-term storage of information received from DCS 140. For example, SS 160 may maintain a database for storing information received from DCS 140. The SS 160 also may be configured to provide long-term storage of other types of information.

In one embodiment, SS 160 is configured to process information received from DCS 140. For example, SS 160 may process the information for use in performing various management and related functions. For example, SS 160 may be configured to apply business intelligence. For example, SS 160 may be configured to correlate data from multiple services (e.g., PCMD data matches, call trace information, log file matching, and the like). For example, SS 160 may be configured to prioritize information received from DCS 140. For example, SS 160 may be configured to perform functions such as problem identification analysis, root cause analysis, problem resolution analysis, and the like, as well as various combinations thereof.

In one embodiment, SS 160 is configured to send control information to DCS 140 for use by DCS 140 in controlling collection of data from DCs 130, controlling processing of collected data by DCS 140, and the like, as well as various combinations thereof. In one embodiment, such control information may be sent by SS 160 in response to trigger requests received at SS 160 (e.g., from element of exemplary wireless communication system 100, from elements external to exemplary wireless communication system 100, and the like).

In one embodiment, SS 160 is configured to perform one or more additional functions in support of the network analysis capability. For example, SS 160 may be configured for one or more of identifying the need to perform tests or instruct other elements to perform tests, responding to prompts from toolsets, utilizing previously collected data (e.g., for control data collection, for use in analyzing collected data, for use in performing various management functions, and the like), and the like, as well as various combinations thereof.

In one embodiment, SS 160 supports a Graphical User Interface (GUI) for providing access to and/or presentation of various types of information depicted and described herein.

The GUI may provide access to and/or control of any of the information depicted and described herein. For example, such a GUI may provide access to and/or control of one or more of data collection trigger information (e.g., trigger lists, trigger rules (e.g., thresholds, conditions, and the like), and the like), data collection feedback information, data collection control information, collected data, business logic, collected data processing rules, results from analysis of collected data (e.g., problem identification analysis results, root cause analysis results, and the like), and the like, as well as various combinations thereof). It is noted that information available via the GUI may be presented in any suitable format (e.g., presentation of network maps showing elements and locations of identified or potential problems, charts and graphs showing analysis results, and the like, as well as various combinations thereof). The GUI may provide a capability to drill down on certain portions of the network to access successively more detailed information, to identify customer impacted by problems or potential problems, and the like, as well as various combinations thereof.

The GUI may be accessible to any suitable users. In one embodiment, for example, the GUI may be accessible to network operations technicians (e.g., local technicians located within a Network Operations Center or other suitable location, remote technicians using UEs $102_O$, and the like, as well as various combinations thereof). In one embodiment, for example, the GUI may be accessible to customers, so that customers are able to log in perform functions such as report problems, determine results of problem analysis and resolution, and the like, as well as various combinations thereof. The GUI may be accessible to any other suitable users.

In one embodiment, SS 160 stores location based services (LBS) information (e.g., for use by one or more of LTE network 110, DCS 140, and the like, as well as various combinations thereof). The LBS information may be used for performing various functions, as described herein.

In one embodiment, SS 160 supports one or more external Application Programming Interfaces (APIs) via which SS 160 may communicate with one or more other systems. The SS 160 may communicate with one or more other systems for correlating information that is determined from within exemplary wireless communication system 100 with information that is determined from outside of exemplary wireless communication system 100, for providing information that is determined from within exemplary wireless communication system 100 to the other system(s) for use in performing various management functions, and the like, as well as various combinations thereof.

In one embodiment, SS 160 may be configured to provide one or more of the functions depicted and described herein as being performed by DCS 140 (e.g., in addition to and/or in place of such functions being performed by DCS 140).

Although primarily depicted and described herein with respect to embodiments in which specific functions are performed by specific elements, it is noted that at least some of the various functions depicted and described herein may be performed by other elements, by combinations of elements, and the like, as well as various combinations thereof.

In one embodiment, UEs 102, DCs 130, and DCS 140 may cooperate to provide various functions. In one embodiment, for example, UEs 102, DCs 130, and DCS 140 may cooperate to provide one or more of: (1) a capability for use of diagnostic applications, available on UEs 102, to trigger data collection and/or saving of existing data DCs 130 (e.g., via providing of data collection feedback information from the diagnostic applications to DCS 140, which triggers DCS 140 to send data collection control information to one or more DCs 130); (2) a capability to analyze and correlate data available on a UE 102 (e.g., error information, diagnostic information, location information, and the like) and provide the data to DCS 140; (3) a capability to isolate and pause data traffic, associated with specific consumer UEs 102 and/or classes of consumer UEs 102, for fixed periods of time. It is noted that many such functions also have been depicted and described within the context of the associated functions performed by the individual elements in order to provide such capabilities.

In one embodiment, DCS 140 and SS 160 may cooperate to provide various functions. In one embodiment, for example, DCS 140 and SS 160 may cooperate to provide one or more of: (1) a capability to configure system elements of exemplary communication system to trap, capture, sort, prioritize, and analyze data collected from various devices (e.g., consumer UEs 102, other computing device using wireless cellular communications on the network, DCs 130 disposed along the network data path, and the like) in order to detect, analyze, and troubleshoot network and/or end-user service troubles; and (2) a capability for using application programming interfaces to allow for external systems and intra-system sharing of data between applications and the data capture systems in the network.

It is noted that the foregoing examples illustrating use of combinations of functional elements to provide various functions and capabilities are merely exemplary, and that the various other capabilities and functions depicted and described herein may be distributed across various functional elements in various other ways.

It is further noted that the foregoing examples illustrating use of combinations of functional elements to provide various functions and capabilities are merely exemplary, and that, as described herein with respect to the various functional element, at least some such capabilities are provided using specific sub-functions performed on the respective functional elements of the described combinations of functional elements.

In one embodiment, a capability is provided for using a UE 102 as a network diagnostic trigger and traffic capture device. As described herein, a UE 102 may include an associated application 103 configured to facilitate such a capability. The use of a UE 102 as a network diagnostic trigger and traffic capture device may depend, with respect to at least some features, on the type of UE 102 (e.g., consumer UE $102_C$ or operator UE $102_O$).

A description of an exemplary embodiment for use of a consumer UE $102_C$ as a network diagnostic trigger and traffic capture device follows. The consumer UE $102_C$ has an application $103_C$ installed thereon. The application $103_C$ may be downloaded to the consumer UE $102_C$ in any suitable manner (e.g., downloaded to the consumer UE $102_C$ in response to a request by the user, pushed to the consumer UE $102_C$ by the WNSP, and the like). The application $103_C$ may already be running on the consumer UE $102_C$ or may be launched on consumer UE $102_C$. The user of the consumer UE $102_C$ may or may not be aware of the application $103_C$, and may continue with normal use of the consumer UE $102_C$. The application $103_C$ performs processes to identify events for which application $103_C$ performs monitoring functions. The application $103_C$ communicates with AS 150, and test data is sent between the application $103_C$ and AS 150. The application $103_C$ collects information based on the test data and, optionally, other network performance indicators. The application $103_C$ performs processes to collect location information (e.g., LBS-based location information, GPS data, and the like), where such location information may be used by DCS 140 for controlling various data collection functions and/or collected data analysis functions. The DCs 130 associated with network elements supporting consumer UE $102_C$ collect and store data (e.g., along the data path between application $103_C$ and AS 150) for the consumer UE $102_C$ (e.g., the DCs 130 may already be collecting such data and/or DCS 140 may provide data collection control information that is adapted for configuring the DCs 130). The DCS 140 receives collected data from the DCs 130 associated with consumer UE $102_C$, which also may include data collected on the consumer UE $102_C$. The DCs 130 may be configured to provide the collected data to DCS 140, the DCS 140 may be configured to periodically request collected data from the DCs 130, and the like. The application $103_C$ also may trigger messages to DCS 140 when predefined events are detected by application $103_C$. The DCS 140 processes collected data for performing functions such as identifying pre-defined events, identifying the locations of events, determining whether additional data is needed or desirable for use in further analyzing network performance, and the like, as well as various combinations thereof. The DCS 140 also may perform functions such as querying DCs 130 for collected data from a recent period of time via circular buffers or other suitable storage of DCs 130, controlling test data streams (e.g., of application $103_C$ and/or AS 150), controlling DCs 130 for instructing DCs 130 to collect additional data, and the like, as well as various combinations thereof. The DCS 140 may process collected data for proactively determining that a particular UE $102_C$ or group of UEs $102_C$ is responsible for or suspected of causing network performance issues. The DCS 140 may perform analysis of critical events, network performance, geographic area, logical area (e.g., as per network architecture/network location), device(s) that are or may be causing network performance degradation, and the like, as well as various combinations thereof. The DCS 140 may provide information to SS 160 for storage and for use in performing additional analysis and associated management functions. The DCS 140 may pause the network traffic for the consumer UE $102_C$ (e.g., for a period of time, such that the effect on the network may be determined and analyzed). The SS 160 may be configured to correlate data with one or more other analysis systems via one or more standard interfaces. The SS 160 may be configured to notify network operations technicians regarding detected events. The SS 160 may be configured to provide information (e.g., identification of events, location information associated with issues or potential issues, and the like) to network operations technicians for use by the network operations technicians in providing various management functions (e.g., performing root cause analysis, performing correction analysis, and the like). It is noted that although the foregoing functions are primarily described within the context of an exemplary embodiment, various combinations of such functions may be utilized within various other embodiments depicted and described herein.

A description of an exemplary embodiment for use of an operator UE $102_O$ as a network diagnostic trigger and traffic capture device follows. The operator UE $102_O$ is taken out to a particular geographic location in the field by a network operations technician (e.g., in response to one or more customer complaints, in response to identification of an issue or potential issue by the WNSP, and the like). The operator UE $102_O$ may be taken out to a particular geographic location in the field by a network operations technician when the associated WNSP identifies a need to perform one or more functions in support of network diagnostics (e.g., to perform tests, control DCs 130 to collect data, control DCS 140 analyze collected data, and the like, as well as various combinations thereof). The operator UE $102_O$ has an application $103_O$ installed thereon. The application $103_O$ may be configured on the operator UE $102_O$ in any suitable manner (e.g., preconfigured on the operator UE $102_O$, downloaded to the operator UE $102_O$ in response to a request by the network operation technician, and the like). The application $103_O$ is configured for being controlled by the network operation technician. The application $103_O$ performs processes to identify events for which application $103_O$ performs monitoring functions. The application $103_O$ communicates with AS 150, and test data is sent between the application $103_O$ and AS 150. The application $103_O$ collects information based on the test data and, optionally, other network performance indicators. The application $103_O$ performs processes to collect location information (e.g., LBS-based location information, GPS data, and the like), where such location information may be used by DCS 140 for controlling various data collection functions and/or collected data analysis functions. The DCs 130 associated with network elements supporting operator UE $102_O$ collect and store data (e.g., along the data path between application $103_O$ and AS 150) for the operator UE $102_O$ (e.g., the DCs 130 may already be collecting such data and/or DCS 140 may provide data collection control information that is adapted for configuring the DCs 130). The application $103_O$ provides a capability for the network operation technician to control various aspects of data collection (e.g., the type of data to be collected, the quantity of data collected, and the like). The DCS 140 receives collected data from the DCs 130 associated with operator UE $102_O$, which also may include data collected on the operator UE $102_O$. The DCs 130 may be configured to provide the collected data to DCS 140, the DCS 140 may be configured to periodically request collected data from the DCs 130, and the like. The application $103_O$ may provide a capability for the network operation technician to specify when data is sent (e.g., from operator UE $102_O$ and/or DCs 130) to DCS 140 for analysis. The application $103_O$ also may trigger messages to DCS 140 when predefined events are detected by application $103_O$. The DCS 140 processes collected data for performing functions such as identifying predefined events, identifying the locations of events, determining whether additional data is needed or desirable for use in further analyzing network performance, and the like, as well as various combinations thereof. The DCS 140 also may perform functions such as querying DCs 130 for collected data from a recent period of time via circular buffers or other suitable storage of DCs 130, controlling test data streams (e.g., of application $103_O$ and/or AS 150), controlling DCs 130 for instructing DCs 130 to collect additional data, and the like, as well as various combinations thereof. The DCS 140 may process collected data for proactively determining that a particular UE $102_C$ or group of UEs $102_C$ is responsible for or suspected of causing network performance issues. The DCS 140 may perform analysis of critical events, network performance, geographic area, logical area (e.g., as per network architecture/network location), device(s) that are or may be causing network performance degradation, and the like, as well as various combinations thereof. The DCS 140 may provide information to SS 160 for storage and for use in performing additional analysis and associated management functions. The DCS 140 may pause the network traffic for the consumer UE $102_C$ (e.g., for a period of time, such that the effect on the network may be determined and analyzed). The SS 160 may be configured to correlate data with one or more other analysis systems via one or more standard interfaces. The SS 160 may be configured to notify network operations technicians regarding detected events. The SS 160 may be configured to provide information (e.g., identification of events, location information associated with issues or potential issues, and the like) to network operations technicians for use by the network operations technicians in providing various management functions (e.g., performing root cause analysis, performing correction analysis, and the like). It is noted that although the foregoing functions are primarily described within the context of an exemplary embodiment, various combinations of such functions may be utilized within various other embodiments depicted and described herein.

Figure 2:
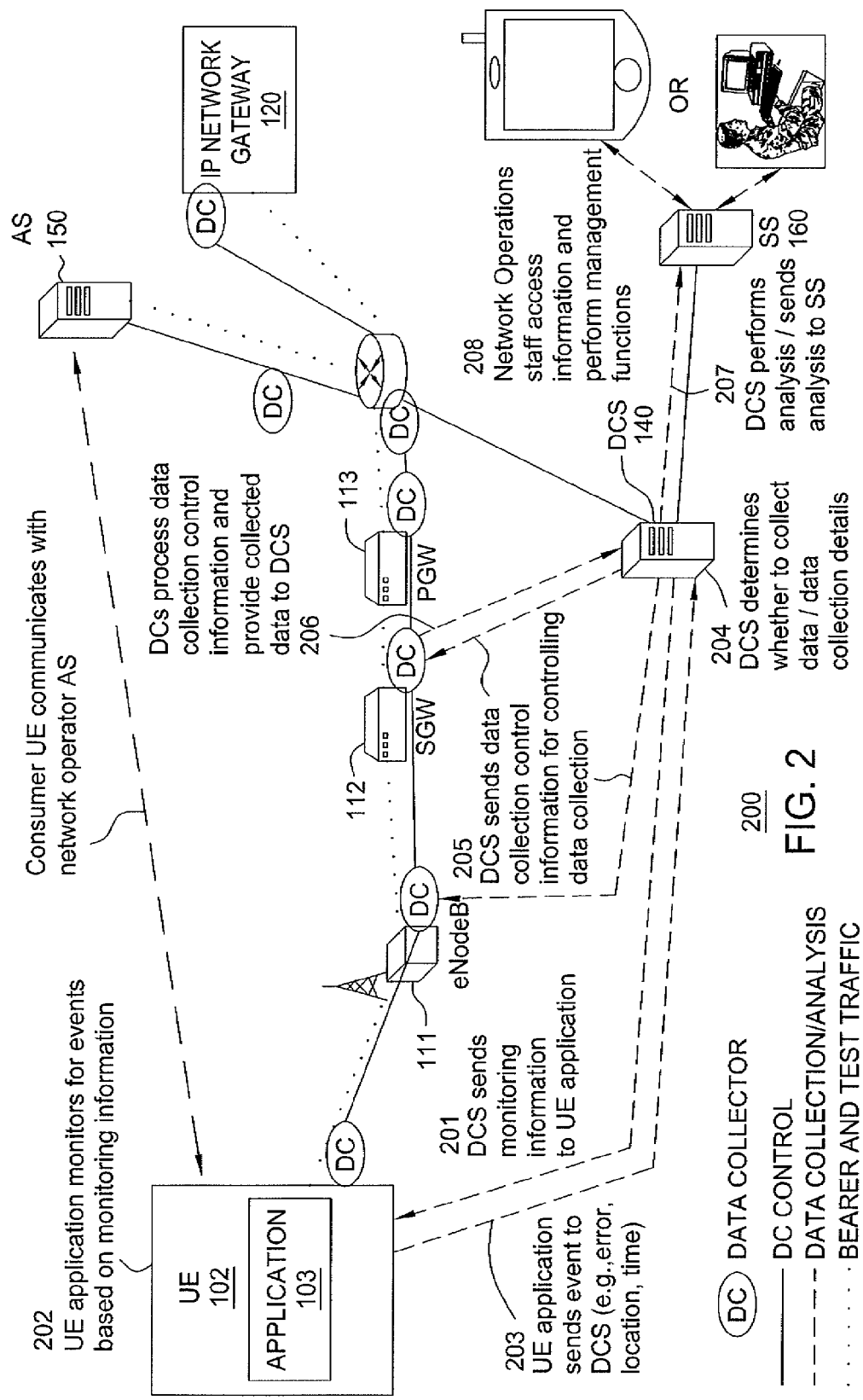
FIG. 2 depicts the exemplary wireless communication system of FIG. 1, illustrating an exemplary use of the network analysis capability for controlling collection of data for use in network performance analysis.

FIG. 2 depicts the exemplary wireless communication system of FIG. 1, illustrating an exemplary use of the network analysis capability for controlling collection of data for use in network performance analysis. It is noted that FIG. 2 is generally applicable to the consumer-based embodiments in which a consumer UE $102_C$ is participating in the process and the operator-based embodiments in which an operator UE $102_O$ is participating in the process.

At step 201, DCS 140 sends monitoring information to the application 103 of UE 102. The monitoring information defines the monitoring to be performed by application 103 of UE 102. For example, the monitoring information may specify that the application 103 of UE 102 is to monitor for various events, trigger conditions, and the like. The monitoring information may be specified in any suitable manner (e.g., using rules, thresholds, and the like, as well as various combinations thereof). It is noted that although primarily depicted and described with respect to an embodiment in which the application 103 of UE 102 receives monitoring information from the DCS 140, the application 103 of UE 102 may receive monitoring information from any other suitable element (e.g., AS 150, SS 160, or any other suitable element(s)).

At step 202, application 103 of UE 102 performs monitoring based on the received monitoring information. For example, the application 103 of UE 102 may monitor for purposes of detecting one or more events, trigger conditions, and the like. For example, an event may be dropping of a call (e.g., which would trigger the application 103 to send associated call-related data, collected by application 103, to DCS 140). For example, an event may be dropping of a data session (e.g., which would trigger the application 103 to send associated session-related data, collected by application 103, to DCS 140). For example, a user of the UE 102 may indicate (e.g., via application 103 or in any other suitable manner) that his or her quality-of-experience is unacceptable, and the application 103 may detect such an indication as an event which would trigger the application 103 to send collected data to DCS 140. It is noted that various other types of events may be defined and, similarly, that monitoring may be performed for detecting various other types of events (e.g., crossing of thresholds, detection of packet loss, receipt of test packets, and the like).

At step 203, application 103 of UE 102, upon detection of an event based on monitoring performed based on the monitoring information, sends data collection feedback information to DCS 140. In FIG. 2, the data collection feedback information is provided in the form of an event reported from the application 103 to DCS 140, although it is noted that such data collection feedback information may be provided to DCS 140 in any other suitable manner. As described herein, and at least partially noted in FIG. 2, the data collection feedback information may include information such as an device information associated with the UE 102 from which the event notification is sent (e.g., identifier of UE 102, device type of UE 102, and the like), details associated with the event (e.g., data collected for purposes of detecting the event, data collected in response to detection of the event, event identifiers/codes, and the like), location information associated with the event (e.g., the location of the UE 102 when the event is detected, which may be based on one or more of LBS information, GPS data, geo-location codes, and the like), timestamp information (e.g., a date/time at which the event was detected by application 103, timestamps associated with collected data, and the like), network path information (e.g., data path encode identifier, network access point identification information from which a network path may be determined, and the like), and the like, as well as various combinations thereof.

In at least some embodiments, for applications $102_C$ of consumer UEs $102_C$ and applications $102_O$ of operator UEs $102_O$, information related to monitoring, event detection, and propagation of data collection feedback information may be specified in terms of and/or include one or more of device status information associated with the UE 102, radio reception status information for the UE 102 (e.g., Service Sector Identifier, Signal Strength, and the like), call characterization information (call length, location, and the like), application related data (e.g., application in use, application performance information (e.g., length of time a page takes to load), quantity of packet drops, data throughput, packet latency, round trip time (RTT), jitter, and the like), and the like, as well as various combinations thereof. It is noted that such information may be used to define the monitoring information upon which event monitoring is based, may be collected and analyzed within the context of monitoring for event detection, and/or may be provided as data collection feedback information reported in response to detection of an event. It is noted that such information may be collected by application 103 on the UE 102, extracted from UE 102 by the application 103, and the like. It is noted that at least some of the information may be collected prior to detection of an event by the application 103 (e.g., where such information is collected and analyzed by the application for determining whether an event is detected such that data collection feedback information is to be reported to DCS 140) and/or after detection of an event (e.g., where detection of an event causes collection of such information to be provided to DCS 140 when the event is reported to DCS 140).

In at least some embodiments, applications $102_O$ of operator UEs $102_O$ may be configured to provide additional functions (e.g., in addition to those described with respect to both consumer UEs $102_C$ and operator UEs $102_O$) related to defining of the monitoring information upon which event monitoring is based, collection and analysis of data within the context of monitoring for event detection, and/or propagation of data collection feedback information reported in response to detection of an event. For example, applications $103_O$ may be configured to enable the operators of the operator UEs $102_O$ to be able to select, from list available from the applications $103_O$, a specific test or tests that will initiate a call or data session so that the associated data may be collected. For example, applications $103_O$ may be configured to automatically send collected data to DCS 140 and/or to enable operators of the UEs $102_O$ to select to send collected data to DCS 140. At step 204, DCS 140 processes the data collection feedback information received from application 103 of UE 102.

The DCS 140 may process the data collection feedback information for determining whether or not to initiate collection of additional data related to the reported event (e.g., is the event an anomaly not requiring further analysis, is the event potential part of a trend or larger problem such that further analysis is or may be useful, and the like).

The DCS 140, upon deciding to initiate collection of additional data (e.g., in response to the event, in response to the event in combination with one or more other reported events, and the like), identifies data collection detail information which may be used by DCS 140 to generate data collection control information that is propagated to other elements for controlling collection of data according to the data collection detail information.

The DCS 140 generates data collection detail information using the data collection feedback information from UE 102. The data collection detail information may include any information suitable for use in generating data collection control information for controlling collection of data.

For example, the data collection detail information may include identification of the element(s) from which data is to be collected, which may be referred to as data collection elements. For example, data collection elements may include DCs 130 (e.g., of one or more of eNodeB 111, SGW 112, PGW 113, ING 120, and the like), application 103 of UE 102, AS 150, and the like.

For example, the data collection detail information may specify the type(s) of data to be collected (e.g., control traffic, bearer traffic, test traffic, test results, and the like), the time period for which data is to be collected (e.g., instructing DCs 130 to provide previously collected data to DCS 140, instructing DCs 130 to initiate collection of data to be provided to DCS 140, and the like), and the like, as well as various combinations thereof.

For example, the data collection detail information may specify information associated with one or more tests to be performed (e.g., types of tests to be performed, conditions under which the tests are to be performed, the manner in which the tests are to be performed, indications of test results expected or desired in response to the tests, and the like, as well as various combinations thereof). For example, such test may include tests related to downloading of content from AS 150 to the UE 102, exchanging of test packets between AS 150 and UE 102, and the like.

The data collection detail information may include any other type(s) of information suitable for use in controlling data collection.

In one embodiment, DCS 140 determines at least a portion of the data collection detail information using the location information received as part of the data collection feedback information. In one such embodiment, for example, the location information may be used by DCS 140 for determining where in the network the problem may be occurring. For example, based on received location information indicative of the geographic location of UE 102 when the event is detected, DCS 140 may identify an eNodeB via which the UE 102 is currently (or at least likely) accessing the LTE network 110 (illustratively, eNodeB 111). The DCS 140, having identified eNodeB 111 from the location information, may then determine the likely data path for data packets of the UE 102 (e.g., a path from eNodeB 111 to SGW 112 to PGW 113, and so forth). As a result, the DCS 140 has identified network elements, along the data path of the UE 102, which may have access to data which may be analyzed for troubleshooting the problem experienced by UE 102. The DCS 140 may then include each of these identified network elements as part of the data collection detail information.

The DCS 140 generates data collection control information using the data collection detail information. The data collection control information is configured for instructing the data collection element(s) as to the data collection detail information. The data collection control information may be provided in any suitable format (e.g., as commands for instructing elements of data collection functions to be performed, as information which may be processed by elements for determining data collection functions to be performed, and the like, as well as various combinations thereof). It is noted that the data collection control information uses at least a portion of the data collection detail information. For example, data collection control information may include information such as (1) information for instructing the DC 130 at eNodeB 111 that it needs to provide, to DCS 140, bearer traffic collected during the previous fifteen minute period for the UE 102, (2) information for instructing the DC 130 at SGW 112 that it needs to initiate collection of bearer traffic for the UE 102, beginning in five minutes and lasting for the next thirty minutes, and provide the collected bearer traffic to DCS 140, and (3) information for instructing the AS 150 that it needs to initiate a test communication with application 103 and provide the test results to DCS 140. It is noted that data collection control information may target any suitable element(s) and may instruct elements to perform any suitable types of data collection functions (i.e., the foregoing examples are merely a few examples of the many different types of data collection functions which may be controlled by DCS 140 via data collection control information).

At step 205, DCS 140 propagates the data collection control information to the data collection elements identified by DCS 140 as elements from which data is to be collected. In FIG. 2, for purposes of clarity, data collection control information is only indicated as being propagated to DCs 130 of eNodeB 111 and SGW 112 and to application 103 of UE 102, although it is noted that data collection control information may be propagated from DCS 140 to any other suitable elements (e.g., DC 130 of PGW 113, AS 150, and the like). In one embodiment, for example, DCS 140 sends instructions to DCs 130 of eNodeB 111 and SGW 112, for instructing the DCs to collect bearer traffic associated with UE 102. In one embodiment (depicted in FIG. 2), for example, DCS 140 sends instructions to the application 103 of UE 102 (e.g., to instruct the application 103 to collect data, to instruct the application 103 to initiate test streams to AS 150 and report the results of the tests, and the like, as well as various combinations thereof). In one embodiment (not depicted in FIG. 2), for example, DCS 140 sends instructions to the AS 150 (e.g., to instruct AS 150 to collect data, to instruct AS 150 to initiate test streams to application 103 and report the results of the tests, and the like, as well as various combinations thereof).

At step 206, the data collection elements receive the data collection control information, process the data collection control information to determine the data to be collected and provided to DCS 140, and send collected data to DCS 140. The DCS 140 receives the collected data from the data collection elements.

At step 207, the DCS 140 analyzes the collected data received from the data collection elements, and propagates the analysis results toward SS 160. The DCS 140 also may propagate the raw collected data toward SS 160 (and/or any other system) for storage. The SS 160 receives the analysis results (and, optionally, the raw collected data).

At step 208, network operations staff access information (e.g., analysis results, raw collected data, and the like), and perform management functions on the basis of the accessed information. As indicated in FIG. 2, the network operations staff may access the information via a terminal in a NOC, via the web on a computer, via a mobile device, and the like. The network operations staff may review analysis results, perform additional analysis on the basis of the received analysis results (and/or any other suitable information), and the like. The network operations staff may perform one or more management functions, such as root cause analysis for determining the root cause of the event which triggered the data collection, problem resolution analysis for attempting to resolve the problem event which triggered the event, and the like, as well as various combinations thereof.

In at least some embodiments, the network analysis capability also and/or alternatively may support one or more additional scenarios and associated functions associated with those scenarios. A few exemplary scenarios and associated functions are depicted and described with respect to FIGS. 3-7. Although primarily depicted and described as independent scenarios having respective groups of associated functions (at least some of which may be common across at least a portion of the scenarios), it is noted that (1) at least some of these exemplary scenarios and associated functions may be combined with each other and/or with one or more scenarios and associated functions specifically depicted and described herein and/or understood as being covered and/or contemplated by various embodiments depicted and described herein, and/or (2) various functions of the exemplary scenarios may be employed within embodiments depicted and described herein, may be combined to form embodiments, and the like, as well as various combinations thereof.

Figure 3:
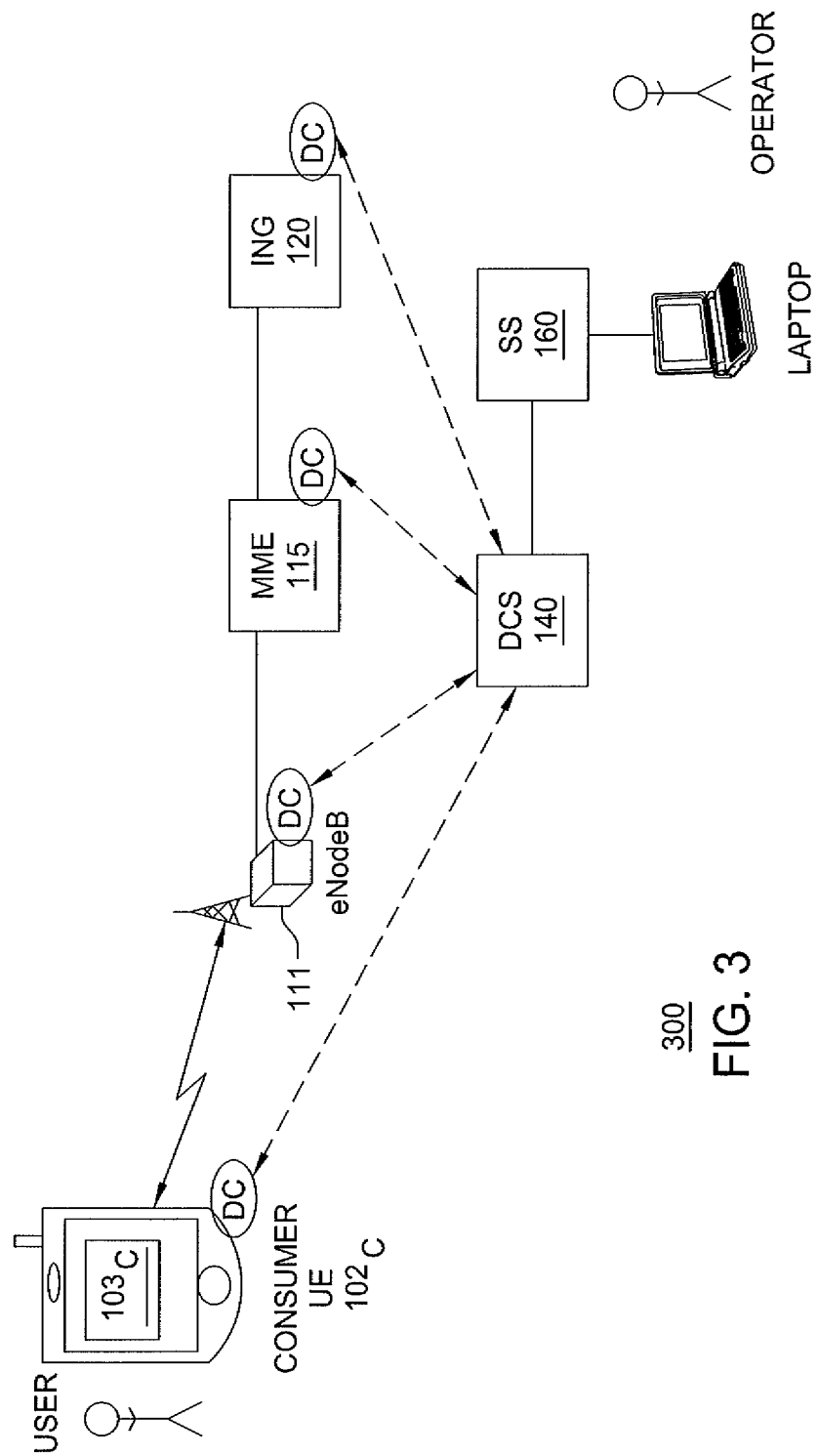
FIG. 3 depicts an exemplary embodiment in which a single UE identifies an event which thereby causes a data collection server to initiate a data collection.

FIG. 3 depicts an exemplary embodiment in which a single UE identifies an event which thereby causes a data collection server to initiate a data collection. FIG. 3 depicts portions of exemplary wireless communication system of FIG. 1. FIG. 3 depicts an exemplary data collection system 300. The exemplary data collection system 300 includes a consumer UE $102_C$ including an application $103_C$ (depicted as being a smartphone, although consumer UE $102_C$ may be any other suitable type of device). The exemplary data collection system 300 includes eNodeB 111 (via which consumer UE $102_C$ accesses the LTE network 110), MME 115, and ING 120. The exemplary data collection system 300 includes DCS 140, which is configured to communicate with DCs 130 associated with eNodeB 111, MME 115, and ING 120. The exemplary data collection system 300 includes SS 160, which is accessible to an operator using a laptop.

As depicted in FIG. 3, a user, via consumer UE 102, is using a phone or phone services via a data connection. The application $103_C$ monitors one or more preset events (e.g., an event to watch for) and detects one of the preset events on the radio communication link between the consumer UE $102_C$ and eNodeB 111. The application $103_C$ signals DCS 140 with details of the detected event. The DCS 140 monitors the number of such events and generates data collection control information for initiating data collection along the path from consumer UE $102_C$-eNodeB 111-MME 115-ING 120. The data collection control information is configured to cause the DCs 130 to save previously collected data and/or to begin collecting data. The DCS 140 receives the collected data from the DCs 130, analyzes the collected data, and provides the analysis results to SS 160. The operator accesses SS 160 via the laptop (or any other suitable device) and finds that the data required to perform additional analysis has already been collected (without the operator having to initiate and control collection of such data), the collected data has already been analyzed, and specific issues are already available for viewing and consideration by the operator (e.g., possible causes for the event, possible actions which may be taken to correct the problem, and the like, as well as various combinations thereof).

Figure 4:
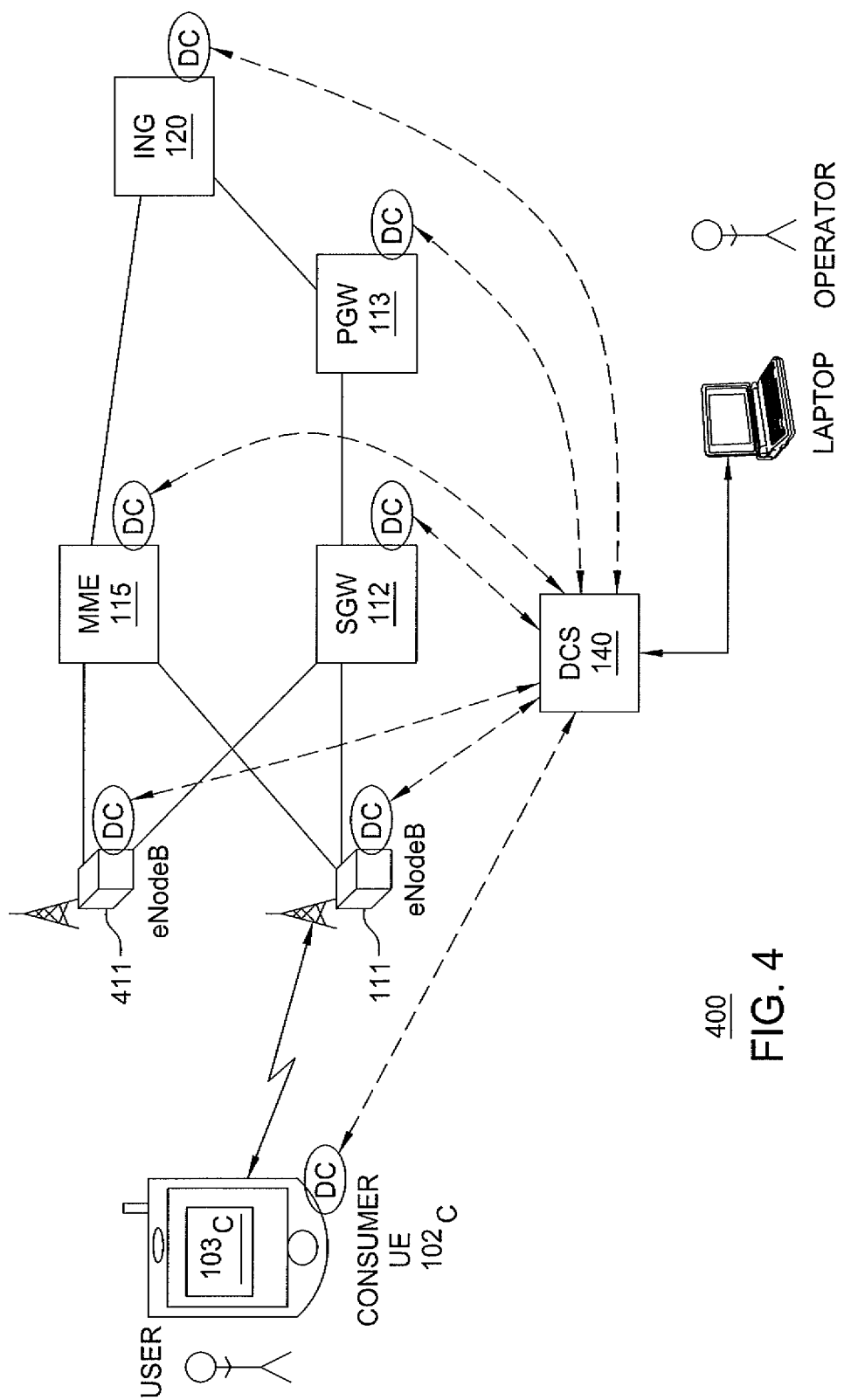
FIG. 4 depicts an exemplary embodiment in which a single UE identifies an event which thereby causes a data collection server to initiate a data collection based on parameters set by the network operator.

FIG. 4 depicts an exemplary embodiment in which a single UE identifies an event which thereby causes a data collection server to initiate a data collection based on parameters set by the network operator. FIG. 4 depicts portions of exemplary wireless communication system of FIG. 1. FIG. 4 depicts an exemplary data collection system 400. The exemplary data collection system 400 includes a consumer UE $102_C$ having an associated application $103_C$ (depicted as being a smartphone, although consumer UE $102_C$ may be any other suitable type of device). The exemplary data collection system 400 includes eNodeB 111 (via which consumer UE $102_C$ accesses the LTE network 110), SGW 112, PGW 113, and ING 120, which are arranged as depicted in FIG. 1. The exemplary data collection system 400 includes MME 115, including communication between eNodeB 111 and MME 115 and communication between MME 115 and ING 120. The exemplary data collection system 400 includes an additional eNodeB 411 (having a DC 130 associated therewith) not depicted in FIG. 1, via which consumer UE $102_C$ may access LTE network 110. As depicted in FIG. 4, eNodeB 111 and eNodeB 411 each communicate with both SGW 112 and MME 115. The exemplary data collection system 300 includes DCS 140, which is configured to communicate with DCs 130 associated with eNodeB 111, eNodeB 411, SGW 112, PGW 113, MME 115, and ING 120. The DCS 140 is accessible to an operator using a laptop.

As depicted in FIG. 4, the operator accesses DCS 140 via the laptop and defines system parameters (e.g., Key Performance Indicators (KPIs), thresholds, events, and the like) for the entire data collection system 400. A user, via consumer UE $102_C$, is using a phone or phone services via a data connection. The application $103_C$ monitors one or more of the preset events and identifies a violation of one of the thresholds set by the operator. The application $103_C$ signals DCS 140 with details of the detected threshold violation. During this time, DCs 130 along the data path have been collecting data. The DCS 140, using intelligence in reference to the parameters configured by the operator and the data path (illustratively, the data path consumer UE $102_C$-eNodeB 111-SGW 112-PGW 113-ING 120), generates data collection control information for initiating collection of additional data along the data path. The data collection control information is configured to cause the DCs 130 to begin collecting additional data. The DCS 140 receives the collected data from the DCs 130, and analyzes the collected data. The operator accesses DCS 140 via the laptop (or any other suitable device) and finds that the data required to perform additional analysis has already been collected (without the operator having to initiate and control collection of such data), the collected data has already been analyzed, and specific issues are already available for viewing and consideration by the operator (e.g., possible causes for the event, possible actions which may be taken to correct the problem, and the like, as well as various combinations thereof).

Figure 5:
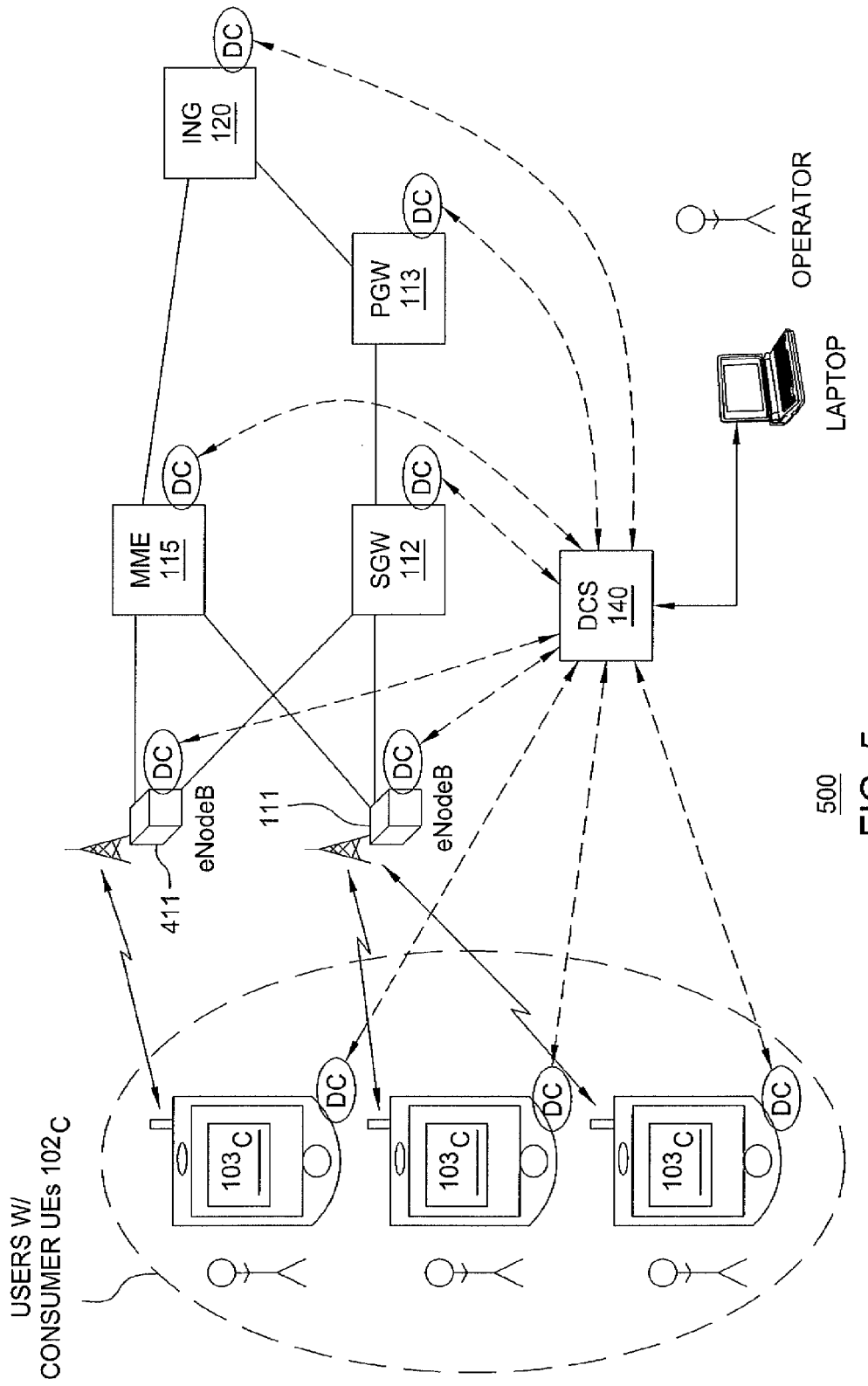
FIG. 5 depicts an exemplary embodiment in which a data collection server correlates multiple events which thereby cause the data collection server to initiate a data collection.

FIG. 5 depicts an exemplary embodiment in which a data collection server correlates multiple events which thereby cause the data collection server to initiate a data collection. FIG. 5 depicts portions of exemplary wireless communication system of FIG. 1. FIG. 5 depicts an exemplary data collection system 500, which is substantially similar to the exemplary data collection system 400 of FIG. 4, although exemplary data collection system 500 illustrates multiple consumer UEs $102_C$ accessing the LTE network 110, as opposed to exemplary data collection system 400 which illustrates only one consumer UEs $102_C$ accessing the LTE network 110.

As depicted in FIG. 5, multiple users are accessing the LTE network 110 via associated consumer UEs $102_C$. The users are using phone or phone services via data connections, respectively. On each consumer UE $102_C$, the associated application $103_C$ monitors one or more preset events (e.g., an event to watch for). Initially, on one of the consumer UEs $102_C$, the application $103_C$ detects one of the preset events based on data connections on the radio communication link between the consumer UE $102_C$ and eNodeB 111. The application $103_C$ signals DCS 140 with details of the detected event. The DCS 140 performs processing (e.g., based on one or more parameters configured on DCS 140) for determining if the single detected event warrants further action (e.g., additional analysis, collection of additional data, and the like). In this case, it is assumed that DCS 140 determines that the detected event is an isolated case and, thus, that no further action need be taken at this point. Later, applications $103_C$ on other consumer UEs $102_C$ detect events and report the detected events to DCS 140. The DCS 140 processes the events and determines that the events are correlated and, thus, that further action is warranted. The DCS 140 uses processing logic to determine data collection detail information (e.g., to identify elements from which to collect additional data, to determined the types of additional information to be collected, and the like). The DCS 140 generates data collection control information for initiating data collection from the identified elements. The data collection control information is configured to cause the DCs 130 to save previously collected data and/or to begin collecting data. The DCS 140 receives the collected data from the DCs 130, and analyzes the collected data. The operator accesses DCS 140 via the laptop (or any other suitable device) and finds that the data required to perform additional analysis has already been collected (without the operator having to initiate and control collection of such data), the collected data has already been analyzed, and specific issues are already available for viewing and consideration by the operator (e.g., possible causes for the event, possible actions which may be taken to correct the problem, and the like, as well as various combinations thereof).

Figure 6:
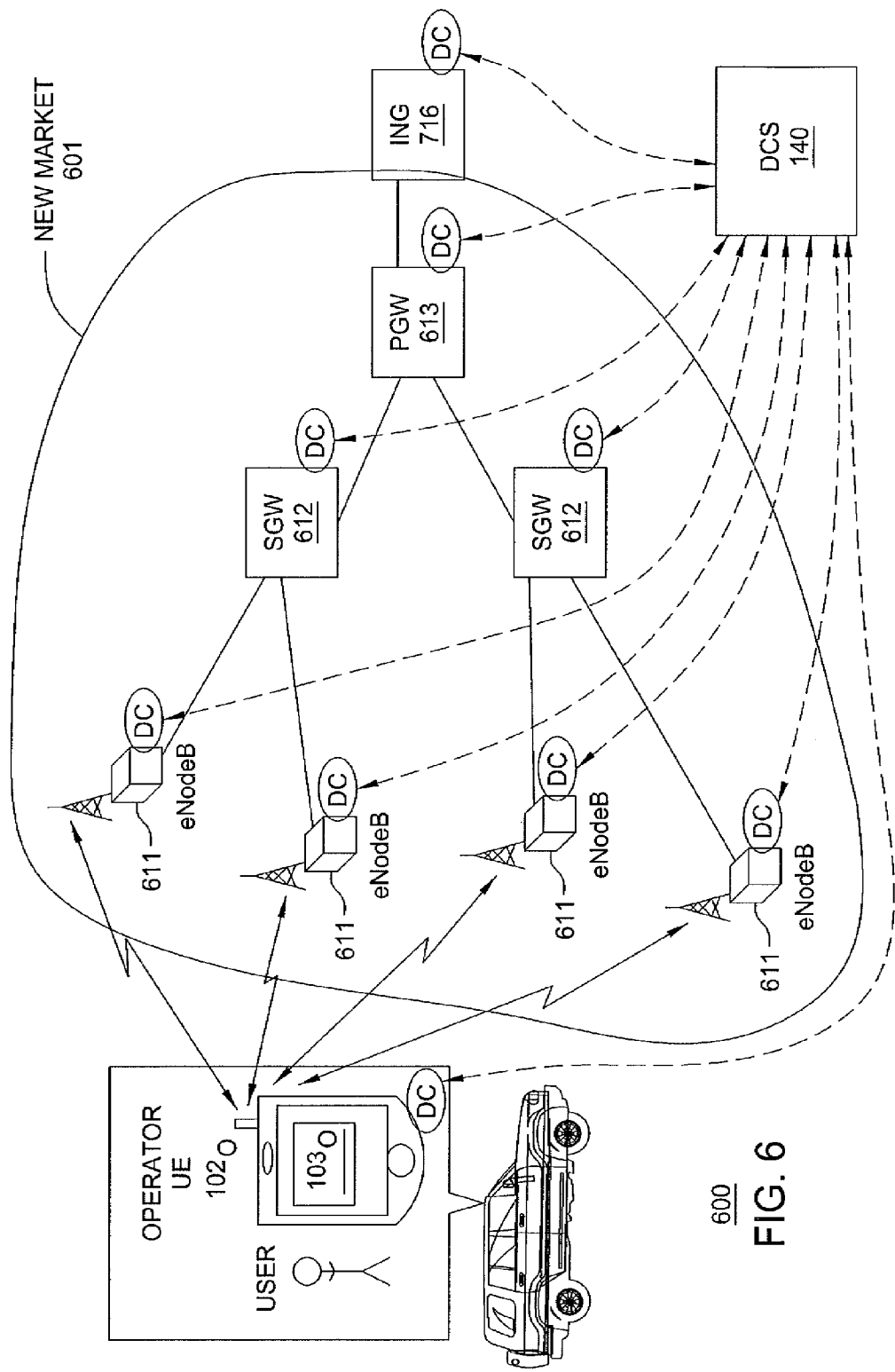
FIG. 6 depicts an exemplary embodiment in which the network operator uses a data collection system to test network performance in a new market segment.

FIG. 6 depicts an exemplary embodiment in which the network operator uses a data collection system to test network performance in a new market segment. FIG. 6 depicts at least some elements similar to those of exemplary wireless communication system of FIG. 1. FIG. 6 depicts an exemplary data collection system 600. The exemplary data collection system 600 includes an operator UE $102_O$ having an associated application $103_O$ (depicted as being a smartphone, although operator UE $102_O$ may be any other suitable type of device). The exemplary data collection system 600 includes four eNodeBs 611, two SGWs 612, a PGW 613, and an IND 620, each of which includes an associated DC 130. The four eNodeBs 611 communicate with SGWs 612 such that two of the eNodeBs communicate with one of the SGWs 612 and the other two of the eNodeBs communicate with the other one of the SGWs 612. The SGWs 612 each communicate with PGW 613. The PGW 613 communicates with ING 620. The exemplary data collection system 300 includes DCS 140, which is configured to communicate with DCs 130 associated with eNodeBs 611, SGWs 612, PGW 613, and ING 620. The DCS 140 is accessible to an operator using a laptop.

As depicted in FIG. 6, the operator drives out to the area of a new market 601 (e.g., where multiple new eNodeBs 611 have been deployed for purposes of providing wireless network access in that geographic area). The operator is carrying an operator UE $102_O$ having an associated application $103_O$ running thereon. The application $103_O$ is configured to monitor for one or more events (e.g., similar to applications $103_C$ on consumer UEs $102_C$) and, further, is configured to enable the operator to access and control DCS 140. The operator may use the application $103_C$ to notify DCS 140 that it should initiate data collection by elements having DCs 130 such that the DCS 140 can receive and monitor all data from/to the operator UE $102_O$. The operator may use the application $103_C$ to access DCS 140 for performing various control operations (e.g., for controlling parameters such as KPIs, thresholds, and the like, as well as various combinations thereof). The DCS 140 generates data collection control information for initiating data collection from elements of new market 601. The data collection control information is configured to cause the DCs 130 to save previously collected data and/or to begin collecting data. The DCS 140 receives the collected data from the DCs 130, and analyzes the collected data. The operator accesses DCS 140 via application $103_O$ on operator UE $102_O$ (or any other suitable device) for accessing and reviewing analysis information, adapting testing of the new market 601, and the like.

Figure 7:
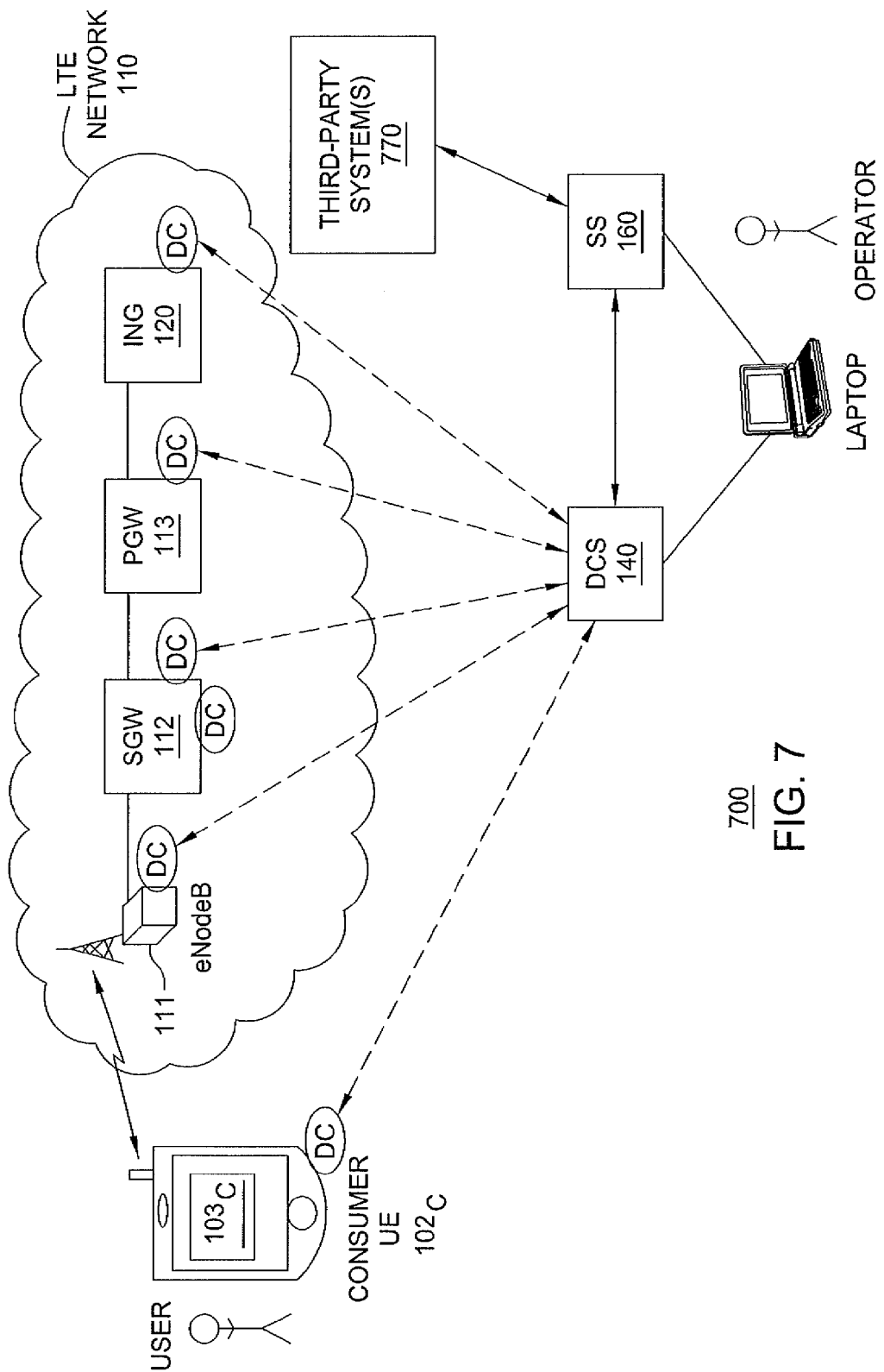
FIG. 7 depicts an exemplary embodiment in which a data collection server collects information from a data collection system, collects information from third-party systems, and correlates the information for use by network operators.

FIG. 7 depicts an exemplary embodiment in which a data collection server collects information from a data collection system, collects information from third-party systems, and correlates the information for use by network operators. FIG. 7 depicts portions of exemplary wireless communication system of FIG. 1. FIG. 7 depicts an exemplary data collection system 700. The exemplary data collection system 700 includes a consumer UE $102_C$ including an application $103_C$ (depicted as being a smartphone, although consumer UE $102_C$ may be any other suitable type of device). The exemplary data collection system 700 includes eNodeB 111 (via which consumer UE $102_C$ accesses the LTE network 110), SGW 112, PGW 113, and ING 120. The exemplary data collection system 700 includes DCS 140, which is configured to communicate with DCs 130 associated with eNodeB 111, SGW 112, PGW 113, and ING 120. The exemplary data collection system 700 includes DCS 140 and SS 160, both of which are accessible to an operator using a laptop. The exemplary data collection system also includes third-party systems 770, which communicate with SS 160.

As depicted in FIG. 7, a user, via consumer UE $102_C$, is using a phone or phone services via a data connection. The application $103_C$ and DCs 130 monitor for one or more preset events. The DCS 140 polls application $103_C$ and the DCs 130, and the DCs 130 send collected data to DCS 140 as events are detected. The DCS 140 analyzes received data and events for determining whether collection of additional data is necessary or desirable. For example, DCS 140 may look into buffers at the DCs 130 for more data from one or more recent timeframes. For example, DCS 140 may determine next actions to be performed (e.g., collecting additional data, triggering execution of tests with the LTE network 110, and the like). For example, DCS 140 may work, via SS 160, to read information from third-party systems 770 (e.g., such as where data from a third-party RF analysis call trace system is sent to DCS 140 via SS 160 and correlated with information received at DCS 140 from DCs 130 and/or consumer UE $102_C$. The operator accesses DCS 140 via the laptop (or any other suitable device) and finds that the data required to perform additional analysis has already been collected (without the operator having to initiate and control collection of such data), the collected data has already been analyzed, and specific issues are already available for viewing and consideration by the operator (e.g., possible causes for the event, possible actions which may be taken to correct the problem, and the like, as well as various combinations thereof).

In one embodiment, a network pause function may be provided in conjunction with one or more of the embodiments depicted and described herein. In one embodiment, the network pause function enables a system (e.g., DCS 140, SS 160, and the like) to issue one or more commands for temporarily pausing communications on one or more UEs 102. The pause command sent to a UE 102 may specify any suitable parameters. For example, in the case of a temporary pause, the command may specify that communications are to be paused immediately and may include a resume timer indicative of a length of time that the UE 102 is to wait before resuming communications (e.g., 10 second, 30 seconds, 60 seconds, 5 minutes, and the like). The control of pausing/resumption of communications on a UE 102 may be controlled using any other suitable parameters. The pausing of communications on a UE 102 may be performed for various reasons (e.g., to facilitate diagnosis of an event reported by the UE 102, to facilitate diagnosis of problem or potential problem in the network, to prevent the UE 102 from consuming network resources in a manner that is or may be negatively impacting other UEs, and the like, as well as various combinations thereof).

Figure 8:
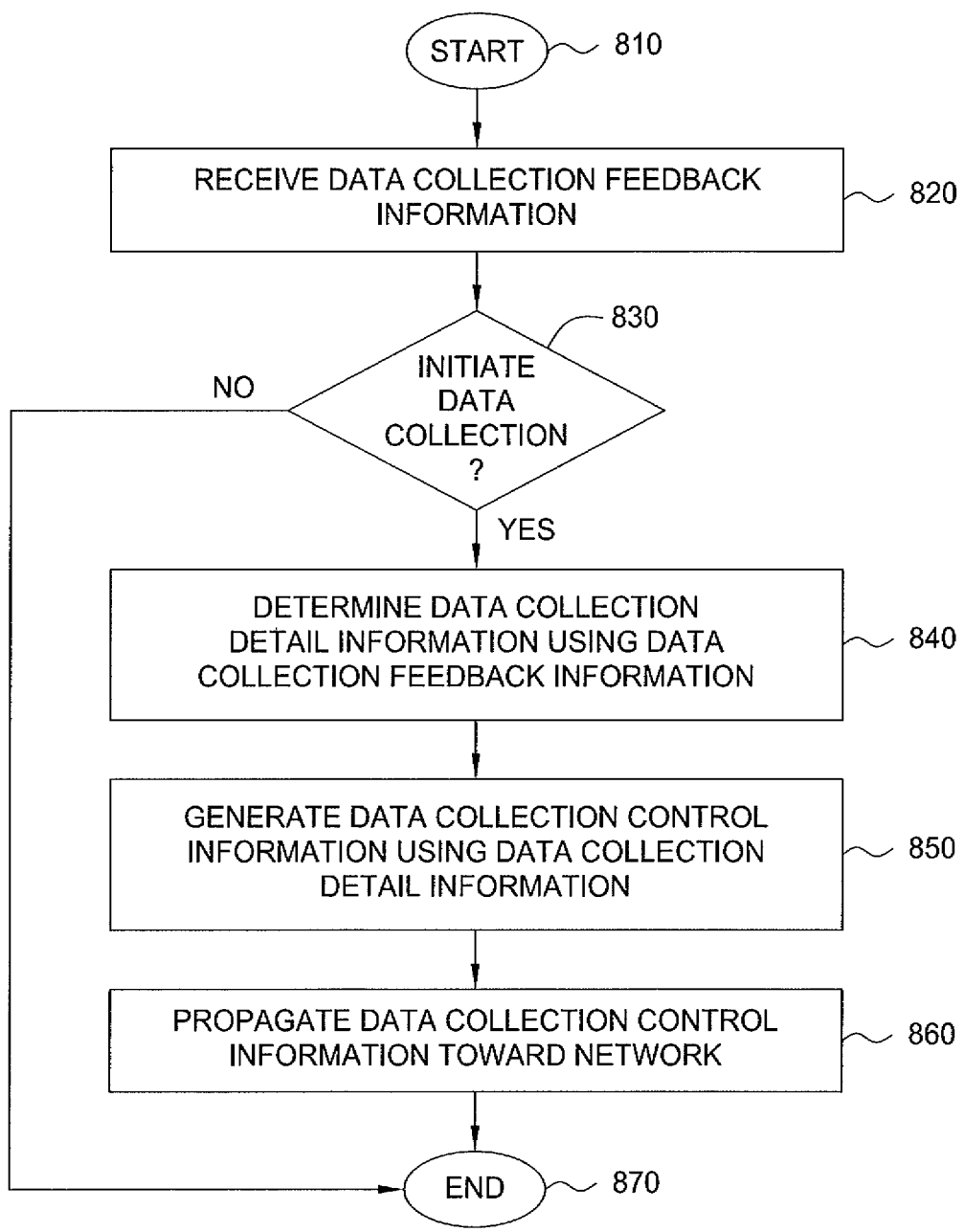
FIG. 8 depicts one embodiment of a method for controlling collection of data from a network.

FIG. 8 depicts one embodiment of a method for controlling collection of data from a network. The method 800 of FIG. 8 may be performed by any suitable element (e.g., such as DCS 140 depicted and described with respect to FIGS. 1-7). The method 800 of FIG. 8 may be better understood when read in conjunction with FIGS. 1-7.

At step 810, method 800 begins.

At step 820, data collection feedback information is received. The data collection feedback information may include information associated with a detected event (e.g., details regarding the event, conditions associated with detection of the event, a geographic location of a wireless user device when the event was detected, time stamp information associated with the event, and the like, as well as various combinations thereof).

At step 830, a determination is made as to whether or not to initiate a data collection from the network. The determination may be made on the basis of the received data collection feedback information and/or any other suitable information. For example, the determination may be based upon the severity of the event reported by the data collection feedback information, whether or not a threshold number of related events have been detected, and the like, as well as various combinations thereof. If a determination is made not to initiate a data collection from the network, method 800 proceeds to step 870, where method 800 ends. If a determination is made to initiate a data collection from the network, method 800 proceeds to step 840.

At step 840, data collection detail information is determined. The data collection detail information may be determined using at least a portion of the data collection feedback information. For example, the data collection detail information may include identification of the element(s) from which data is to be collected, the type(s) of data to be collected, the time period for which data is to be collected, information associated with one or more tests to be performed, and the like, as well as various combinations thereof.

In one embodiment, in which data collection feedback information is received from a wireless user device and includes location information indicative of a geographic location of the wireless user device (e.g., at the time of detection of an event by the wireless user device, at the current time, and the like), at least a portion of the data collection detail information may be determined based at least in part on the location information indicative of a geographic location of the wireless user device.

In one embodiment, for example, the location information indicative of a geographic location of the wireless user device is used to determine at least a portion of a network path (e.g., from a wireless access node to a gateway to an IP network, from a wireless access node to a point beyond a gateway to an IP network, and the like) via which the wireless user device is communicating or may communicate.

In one embodiment, for example, the location information indicative of a geographic location of the wireless user device is used to identify the wireless access node via which the wireless user device accesses the network. For example, given information indicative of the geographic location of the wireless user device and geographic location information identifying the geographic locations of the wireless access nodes in the network, the wireless access node in the network that is geographically closest to the geographic location reported by the wireless user device may be identified as the wireless access node.

In one further embodiment, for example, at least a portion of the network path is identified based on identification of the wireless access node. For example, the identity of the wireless access node may be used to identify a next network element along the network path, which may be used to identify a next network element along the network path, and so on, until part/all of the network path has been identified. It is noted that other types of information, in addition to identification of a previous node on the network path, may be used to identify a next node on the network path. At step 850, data collection control information is generated. The data collection control information may be generated using at least a portion of the data collection detail information. The data collection control information is configured to instruct one or more elements regarding data to be collected and provided for analysis.

At step 860, the data collection control information is propagated toward the network.

At step 870, method 800 ends.

Although depicted and described as ending (for purposes of clarity), it will be appreciated that the element that is executing method 800 may continue to operate (e.g., for receiving and processing data collection feedback information, performing analysis of data collected from elements of the network, providing analysis results to other systems, and the like, as well as various combinations thereof), that one or more other elements may execute one or more data collection processes upon receiving data collection control information, and the like.

Figure 9:
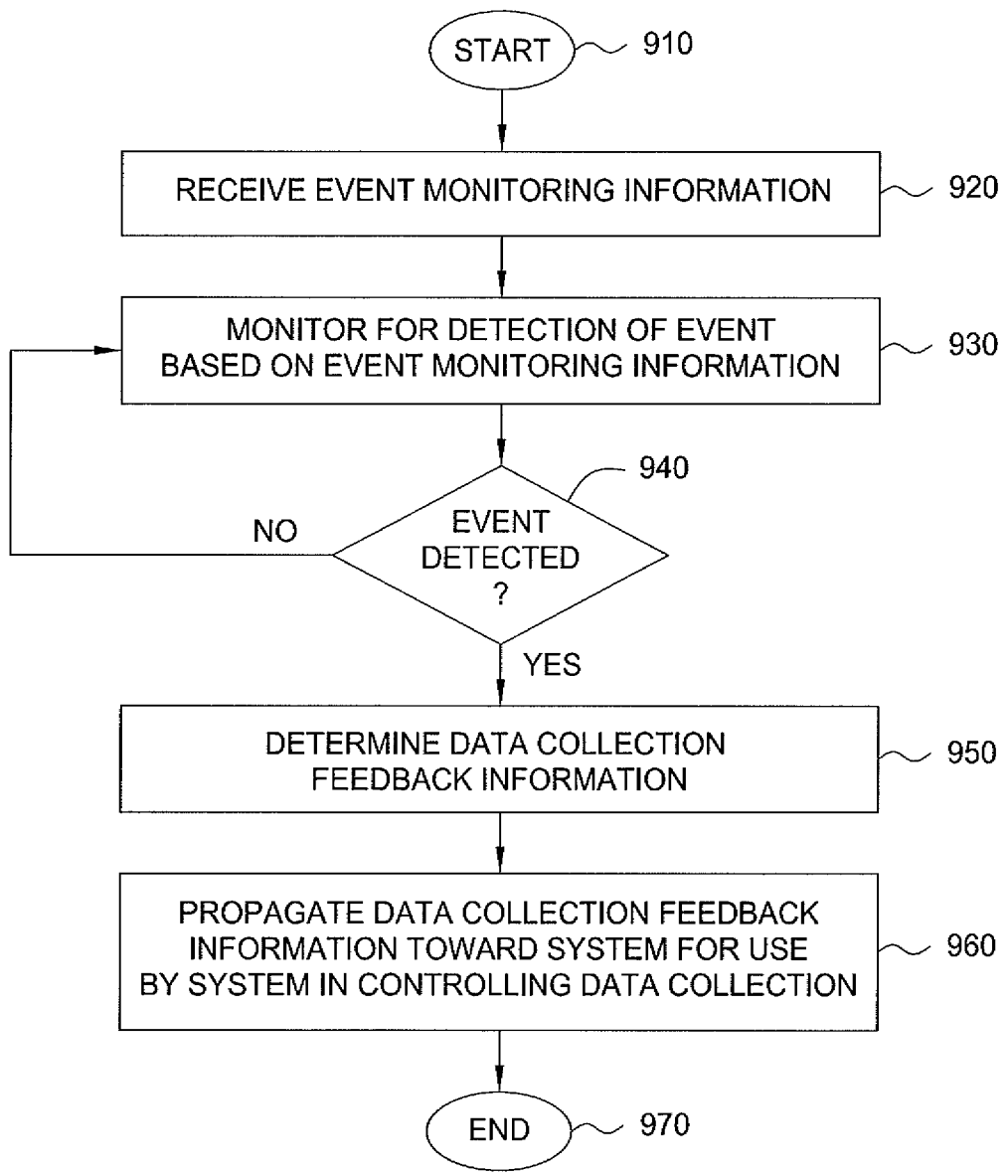
FIG. 9 depicts one embodiment of a method for providing data collection feedback information in response to detection of an event.

FIG. 9 depicts one embodiment of a method for providing data collection feedback information in response to detection of an event. The method 900 of FIG. 9 may be performed by any suitable element (e.g., such a consumer or operator UE 102, a network element, and the like). The method 900 of FIG. 9 may be better understood when read in conjunction with FIGS. 1-7.

At step 910, method 900 begins.

At step 920, event monitoring information is received. The event monitoring information specifies monitoring conditions for one or more events (e.g., KPIs, thresholds, rules, and the like, as well as various combinations thereof).

At step 930, monitoring for detection of an event is performed based on the event monitoring information. At step 940, a determination is made as to whether an event is detected during monitoring for detection of an event. If an event is not detected, method 900 returns to step 930 such that monitoring for detection of an event continues. If an event is detected, method 900 proceeds to step 950. It is noted that steps 930 and 940 may be considered to be a single step.

At step 950, data collection feedback information is determined based on detection of the event. The data collection feedback information includes information, associated with detection of the event, which may be used for controlling collection of data. For example, the data collection feedback information may include information such as an device information associated with the UE 102 from which the event notification is sent (e.g., identifier of UE 102, device type of UE 102, and the like), details associated with the event (e.g., data collected for purposes of detecting the event, data collected in response to detection of the event, event identifiers/codes, and the like), location information associated with the event (e.g., the location of the UE 102 when the event is detected, which may be based on one or more of LBS information, GPS data, geo-location codes, and the like), timestamp information (e.g., a date/time at which the event was detected by application 103, timestamps associated with collected data, and the like), network path information (e.g., data path encode identifier, network access point identification information from which a network path may be determined, and the like), and the like, as well as various combinations thereof.

At step 960, the data collection feedback information is propagated toward a system for use in controlling data collection performed by the system.

At step 970, method 900 ends.

Although depicted and described as ending (for purposes of clarity), it will be appreciated that the element that is executing method 900 may continue to operate (e.g., for monitoring for events based on current event monitoring information, for receiving new event monitoring information and monitoring for events based on such new event monitoring information, and the like, as well as various combinations thereof), that one or more other elements may execute one or more data collection processes upon receiving data collection feedback information, and the like.

Although primarily depicted and described herein with respect to use of the network analysis capability in conjunction with specific types of endpoint devices (e.g., smartphones), it is noted that at least some of the embodiments of the network analysis capability may be applicable for use with other types of endpoint devices (e.g., cellular phones, computers using wireless cellular technology for network access, other types of mobile cellular wireless enabled devices utilizing packet switched technology, and the like, as well as various combinations thereof). Similarly, it is noted that various embodiments of the network analysis capability may be utilized in conjunction with any devices which may be associated with a wireless cellular network interface for use as a data communication network path.

Although primarily depicted and described herein with respect to use of the network analysis capability in conjunction with specific types of wireless devices (e.g., smartphones, traditional cell phones, and the like), it is noted that various other types of wireless devices (e.g., tablets, netbooks, machine-to-machine (M2M) devices, and the like) may monitor for events, collect data, provide feedback information, and perform like functions in support of various embodiments of the network analysis capability.

Although primarily depicted and described herein with respect to use of the network analysis capability in conjunction with a specific type of wireless communication network (namely, LTE), it is noted that at least some of the embodiments of the network analysis capability may be applicable for use with other types of wireless communication networks (e.g., CDMA wireless networks, metrocell-based networks, femtocell-based networks, and the like).

Although primarily depicted and described herein with respect to use of the network analysis capability in conjunction with wireless networks, it is noted that at least some of the embodiments of the network analysis capability may be applicable for use with wired communication networks.

Figure 10:
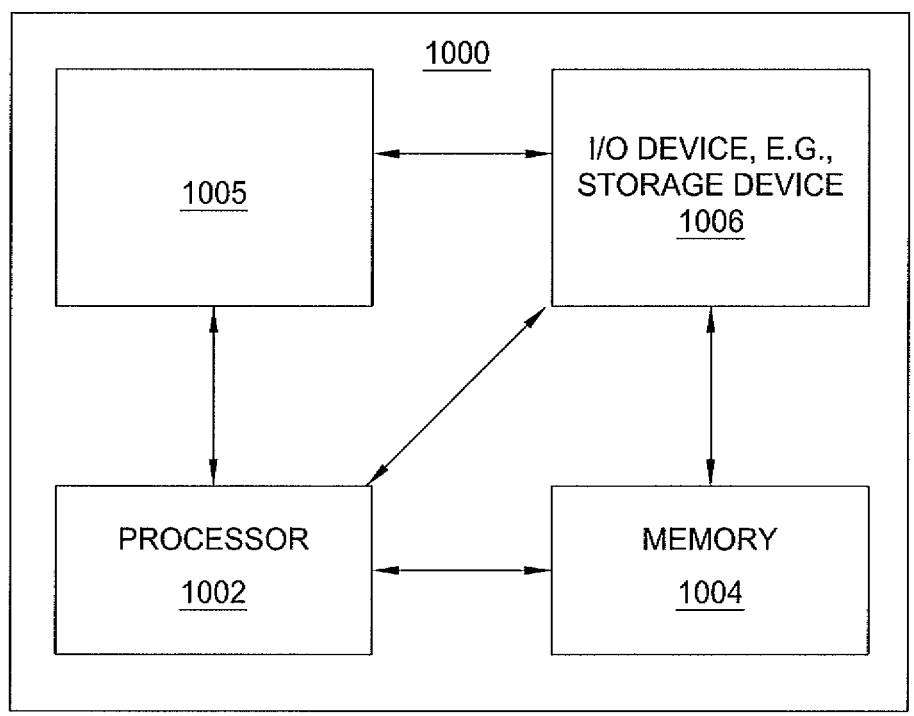
FIG. 10 depicts a high-level block diagram of a computer suitable for use in performing the functions described herein.

FIG. 10 depicts a high-level block diagram of a computer suitable for use in performing functions described herein.

As depicted in FIG. 10, computer 1000 includes a processor element 702 (e.g., a central processing unit (CPU) and/or other suitable processor(s)) and a memory 1004 (e.g., random access memory (RAM), read only memory (ROM), and the like). The computer 1000, optionally, may include a cooperating module/process 1005 and/or various input/output devices 1006 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software for executing on a general purpose computer so as to implement a special purpose computer, and/or may be implemented on hardware, one or more application specific integrated circuits (ASIC), and/or any other hardware equivalents. In one embodiment, at least a portion of the functions depicted and described herein may be implemented on a network analysis node for a network. In one embodiment, the cooperating process 1005 can be loaded into memory 1004 and executed by processor 1002 to implement the functions as discussed herein. As such, cooperating process 1005 (including associated data structures) can be stored on a computer readable storage medium, e.g., RAM memory, magnetic or optical drive or diskette, and the like.

It will be appreciated that computer 1000 depicted in FIG. 10 provides a general architecture and functionality suitable for implementing functional elements described herein and/or portions of functional elements described herein. For example, the computer 1000 provides a general architecture and functionality suitable for implementing one or more of the UEs, eNodeBs, SGWs, PGWs, MME, HSS, AAA Server, router, ING, DCS, AS, SS, and the like. For example, the computer 1000 provides a general architecture and functionality suitable for implementing one or more of DCs implemented on or associated with one or more of the UEs, eNodeBs, SGWs, PGWs, router, and ING.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus for controlling collection of data from a network, comprising:
a processor and a memory communicatively connected to the processor, the processor configured to:
receive feedback information from a wireless user device configured to communicate via a network path comprising a set of network elements of the network, wherein the feedback information comprises information indicative of detection of an event by the wireless user device, wherein the feedback information comprises location information indicative of a geographic location of the wireless user device when the event is detected;
identify, from the set of network elements of the network path, two or more network elements of the network path from which data related to the event is to be collected, at least one of the two or more network elements being identified based at least in part on the location information; and
propagate, toward the two or more network elements of the network path, respective messages adapted for requesting data from the two or more network elements of the network path.

2. The apparatus of claim 1, wherein the location information comprises at least one of:
Location Based Service (LBS) information associated with the wireless user device; or
Global Positioning System (GPS) data associated with the wireless user device.

3. The apparatus of claim 1, wherein the at least one of the two or more network elements identified based at least in part on the location information comprises a wireless access node located near the geographic location of the wireless user device.

4. The apparatus of claim 3, wherein the processor is configured to:
identify at least a portion of the network path based on the wireless access node; and
identify at least one other of the two or more network elements based on the identified at least a portion of the network path.

5. The apparatus of claim 1, wherein, for at least one of the two or more network elements, the respective message adapted for requesting data from the network element comprises at least one of:
a message configured for instructing the network element to begin collecting data; or
a message configured for instructing the network element to retrieve previously collected data.

6. The apparatus of claim 1, wherein the processor is configured to:
receive data from at least one of the two or more network elements of the network path from which data related to the event is to be collected; and
process at least a portion of the received data for providing a management function.

7. The apparatus of claim 1, wherein the processor is configured to:
propagate, toward the wireless user device, condition information for configuring the wireless user device to monitor for the event.

8. The apparatus of claim 1, wherein the processor is configured to:
propagate, toward at least one of the wireless user device or an application server, a message comprising an instruction for a test to be performed between the wireless user device and the application server.

9. The apparatus of claim 1, wherein the processor is configured to:
receive a test result associated with a test performed between the wireless user device and an application server; and
identify at least one of the two or more network elements of the network path from which data related to the event is to be collected based at least in part on the test result.

10. The apparatus of claim 1, wherein the processor is configured to:
propagate, toward the wireless user device, a message adapted for causing the wireless user device to pause communications for a period of time.

11. A method for controlling collection of data from a network, comprising:
using a processor and a memory for:
receiving feedback information from a wireless user device configured to communicate via a network path comprising a set of network elements of the network, wherein the feedback information comprises information indicative of detection of an event by the wireless user device, wherein the feedback information comprises location information indicative of a geographic location of the wireless user device when the event is detected;
identifying, from the set of network elements of the network path, two or more network elements of the network path from which data related to the event is to be collected, at least one of the two or more network elements being identified based at least in part on the location information; and
propagating, toward the two or more network elements of the network path, respective messages adapted for requesting data from the two or more network elements of the network path.

12. The method of claim 11, wherein the location information comprises at least one of:
Location Based Service (LBS) information associated with the wireless user device; or
Global Positioning System (GPS) data associated with the wireless user device.

13. The method of claim 11, wherein the at least one of the two or more network elements identified based at least in part on the location information comprises a wireless access node located near the geographic location of the wireless user device.

14. The method of claim 13, further comprising:
identifying at least a portion of the network path based on the wireless access node; and
identifying at least one other of the two or more network elements based on the identified at least a portion of the network path.

15. The method of claim 11, further comprising:
receiving data from at least one of the two or more network elements of the network path from which data related to the event is to be collected; and
processing at least a portion of the received data for providing a management function.

16. The method of claim 11, further comprising:
propagating, toward the wireless user device, a message adapted for causing the wireless user device to pause communications for a period of time.

17. A non-transitory computer readable storage medium storing instructions which, when executed by a computer, cause the computer to perform a method for controlling collection of data from a network, the method comprising:
receiving feedback information from a wireless user device configured to communicate via a network path comprising a set of network elements of the network, wherein the feedback information comprises information indicative of detection of an event by the wireless user device, wherein the feedback information comprises location information indicative of a geographic location of the wireless user device when the event is detected;

identifying, from the set of network elements of the network path, two or more network elements of the network path from which data related to the event is to be collected, at least one of the two or more network elements being identified based at least in part on the location information; and propagating, toward the two or more network elements of the network path, respective messages adapted for requesting data from the two or more network elements of the network path.

18. The method of claim 11, further comprising:
propagating, toward the wireless user device, condition information for configuring the wireless user device to monitor for the event.

19. The method of claim 11, further comprising:
propagating, toward at least one of the wireless user device or an application server, a message comprising an instruction for a test to be performed between the wireless user device and the application server.

20. The method of claim 11, further comprising:
receiving a test result associated with a test performed between the wireless user device and an application server; and
identifying at least one of the two or more network elements of the network path from which data related to the event is to be collected based at least in part on the test result.

* * * * *